(12) United States Patent
Mather et al.

(10) Patent No.: US 10,935,699 B2
(45) Date of Patent: Mar. 2, 2021

(54) SHAPE MEMORY ASSISTED SELF-HEALING POLYMERIC AMORPHOUS COATINGS

(71) Applicants: Patrick T. Mather, Syracuse, NY (US); Erika Rodriguez, Brisbane, CA (US); Xiaofan Luo, Changshu (CN); Sabrina Crandall, Oswego, NY (US)

(72) Inventors: Patrick T. Mather, Syracuse, NY (US); Erika Rodriguez, Brisbane, CA (US); Xiaofan Luo, Changshu (CN); Sabrina Crandall, Oswego, NY (US)

(73) Assignee: Syracuse University, Syracuse, NY (US)

( * ) Notice: Subject to any disclaimer, the term of this patent is extended or adjusted under 35 U.S.C. 154(b) by 500 days.

(21) Appl. No.: 15/028,455

(22) PCT Filed: Nov. 11, 2014

(86) PCT No.: PCT/US2014/064917
§ 371 (c)(1),
(2) Date: Apr. 11, 2016

(87) PCT Pub. No.: WO2015/054703
PCT Pub. Date: Apr. 16, 2015

(65) Prior Publication Data
US 2016/0252659 A1    Sep. 1, 2016

Related U.S. Application Data

(60) Provisional application No. 61/889,211, filed on Oct. 10, 2013.

(51) Int. Cl.
*G02B 1/14* (2015.01)
*C03C 17/32* (2006.01)
(Continued)

(52) U.S. Cl.
CPC ............... *G02B 1/14* (2015.01); *C03C 17/32* (2013.01); *C09D 4/06* (2013.01); *C03C 2217/78* (2013.01); *G02B 1/04* (2013.01)

(58) Field of Classification Search
CPC .. G02B 1/14; G02B 1/04; C03C 17/32; C03C 2217/78; C09D 4/06; C08L 83/04
(Continued)

(56) References Cited

U.S. PATENT DOCUMENTS

| 4,954,591 A | 9/1990 | Belmares |
| 5,149,746 A * | 9/1992 | Pater ............... C08G 73/1007 |
| | | 525/422 |

(Continued)

FOREIGN PATENT DOCUMENTS

WO    2013/148129    10/2013

OTHER PUBLICATIONS

International Search Report Form PCT/ISA/220, International Application No. PCT/US2014/64917, pp. 1-8, Dated Jan. 21, 2015.

*Primary Examiner* — Michael A Salvitti
(74) *Attorney, Agent, or Firm* — Bond Schoeneck and King PLLC; David Nocilly; George McGuire

(57) ABSTRACT

An amorphous, optically transparent, colorless shape memory assisted self-healing coating for optical glassware applications that uses a combination of surface shape memory and self-healing properties to repair damaged sites on glass substrates when exposed to a thermal stimulus. The coating includes a miscible combination of a network polymer and a linear polymer having glass transition temperate between room temperature and about 40 degrees C. The coating can be used for corrective eyewear, for windshields and windows in automobiles and motorcycles, as well for as optical coatings wherever needed.

9 Claims, 34 Drawing Sheets

(51) Int. Cl.
 *C09D 4/06* (2006.01)
 *G02B 1/04* (2006.01)
(58) Field of Classification Search
 USPC .......................................................... 428/442
 See application file for complete search history.

(56) References Cited

U.S. PATENT DOCUMENTS

| | | |
|---|---|---|
| 7,465,414 B2 | 12/2008 | Knox et al. |
| 2004/0096666 A1* | 5/2004 | Knox ..................... B32B 27/08 428/412 |
| 2005/0258408 A1 | 11/2005 | Molock et al. |
| 2012/0121845 A1 | 5/2012 | Gronewolt et al. |
| 2012/0213969 A1* | 8/2012 | Mather ................. C08F 220/14 428/156 |

* cited by examiner

SHAPE MEMORY ASSISTED SELF-HEALING POLYMERIC AMORPHOUS COATINGS

CROSS-REFERENCE TO RELATED APPLICATIONS

The present application claims priority to U.S. Provisional No. 61/889,211, filed on Oct. 10, 2013.

BACKGROUND OF THE INVENTION

1. Field of the Invention

The present invention relates to self-healing polymer systems and, more particularly, to a shape memory assisted self-healing polymer having improved optical qualities.

2. Description of the Related Art

Microcrack formation and scratches contribute to the decline in visibility through optical lenses used in consumer and industrial products. To prevent this damage from occurring, coatings are often used to protect the optical lenses. The primary function of a coating is to protect sensitive surfaces from their environment. For example, eyeglasses made from polymeric materials, such as polycarbonate, contain a built-in scratch-resistant coating and other additional coatings are commercially available for optical lenses, such as those used for anti-reflectance and anti-fog applications. Scratch-resistant coatings may prolong the "life" of optical lenses; however, they can still be damaged in the same manner as unprotected glass or polycarbonate. Thus, the need exists for a transparent coating that has high mechanical and scratch-resistant properties to assist in reducing the degree of damage and to optimize the visibility through the system of interest.

Potential systems for addressing these problems are shape memory assisted self-healing (SMASH) materials that can be used for coatings for protective purposes. However, none of the existing self-healing systems are acceptable for optical application. For example, anticorrosion SMASH coatings formed from electro-spun poly(ε-caprolactone) (PCL) fibers that are interpenetrated with Norland Optical Adhesive 63 (NOA63) shape-memory amorphous thermoset result in a white opaque solid layer that is not optically transparent or colorless, making in ineffective for use on optical lenses. Similarly, SMASH coatings formed from crosslinked of poly(ε-caprolactone) diacrylate (n-PCL) and linear PCL thermoplastic (1-PCL) are also opaque and thus not suited for optical applications. Thus, there is a need for a SMASH system that provides a transparent coating that is acceptable for use as an optical coating.

BRIEF SUMMARY OF THE INVENTION

The present invention comprises an optical coating system made from a single amorphous phase having a network polymer component and a linear polymer component. The network polymer component and the linear polymer component are miscible and each have a glass transition temperature between 25 degrees Celsius and 40 degrees Celsius. The linear polymer component is inter-coiled within the network polymer component to form a semi-interpenetrating polymer network. The network polymer component may be a tert-a butyl acrylate network formed from tert-a butyl acrylate cross-linked with tetrathyleneglycol dimethacrylate. The linear polymer component may be a tert-butyl acrylate thermoplastic. The single amorphous phase can range between 10 percent of the linear polymer and 90 percent of the network polymer by weight, 25 percent of the linear polymer and 75 percent of the network polymer by weight, and 50 percent of the linear polymer and 50 percent of the network polymer by weight. The system may be used as a coating by binding the single amorphous phase to a substrate bound. For example, the substrate may comprise glass that is covalently bound to the single amorphous phase by silanization.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 15A:
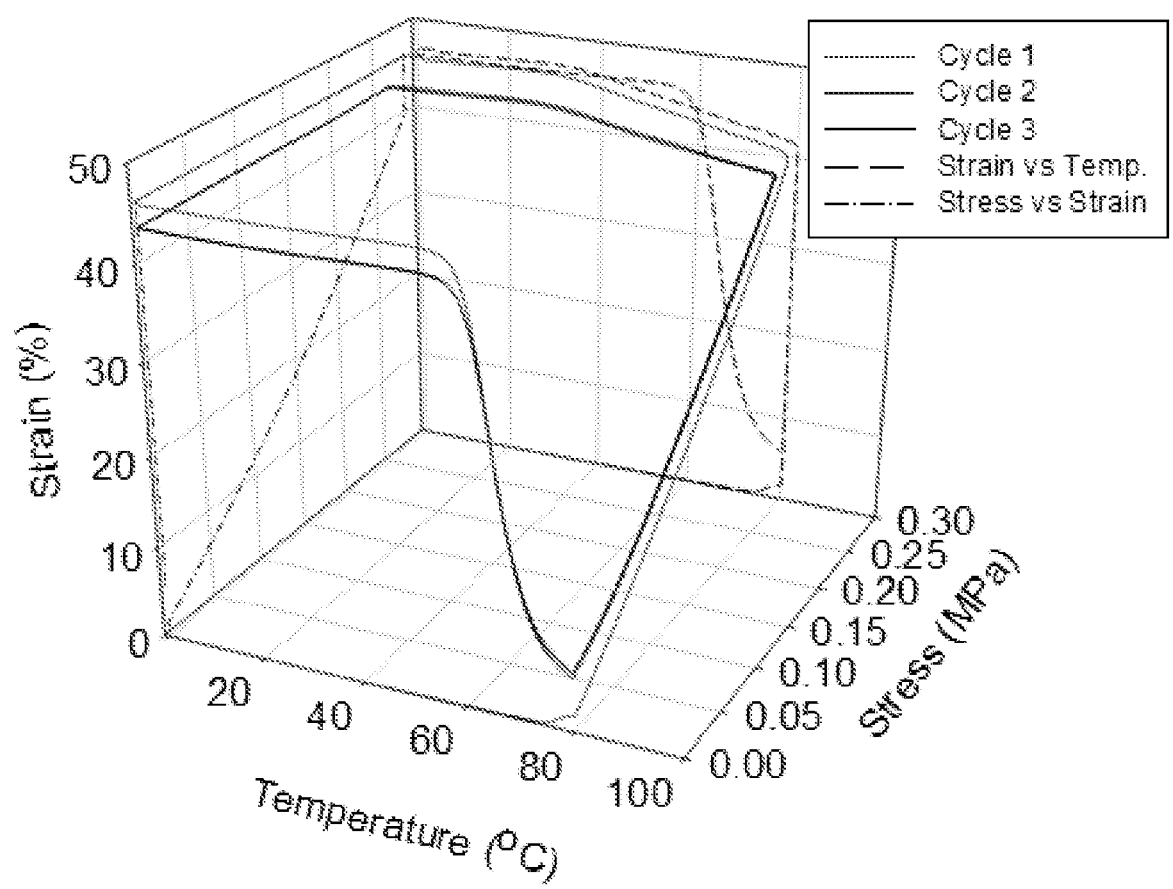
Figure 15B:
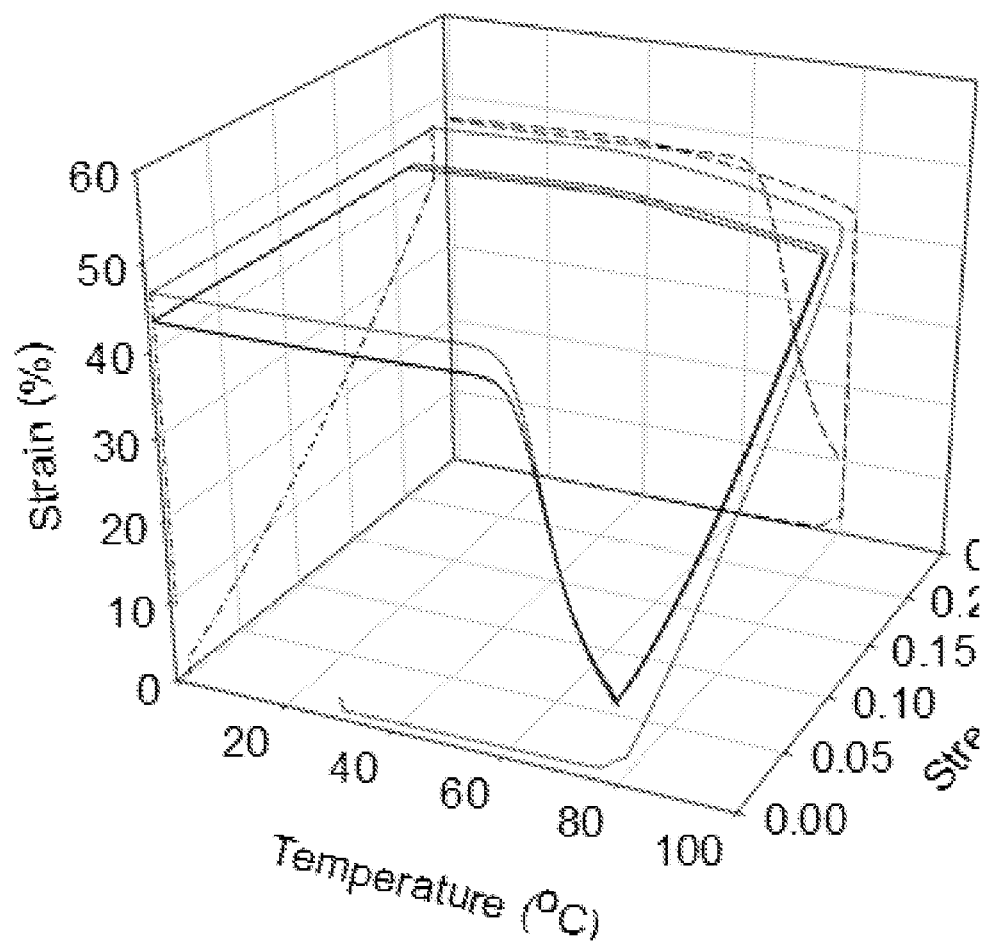
Figure 15C:
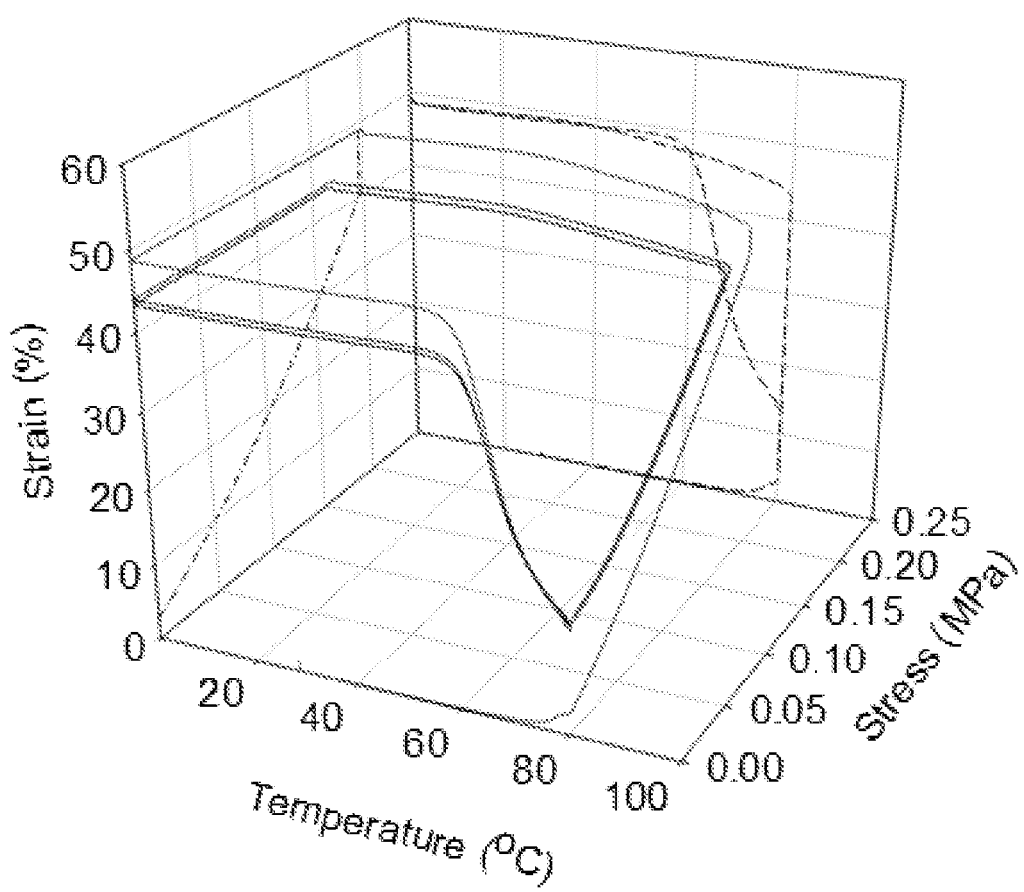
Figure 15D:
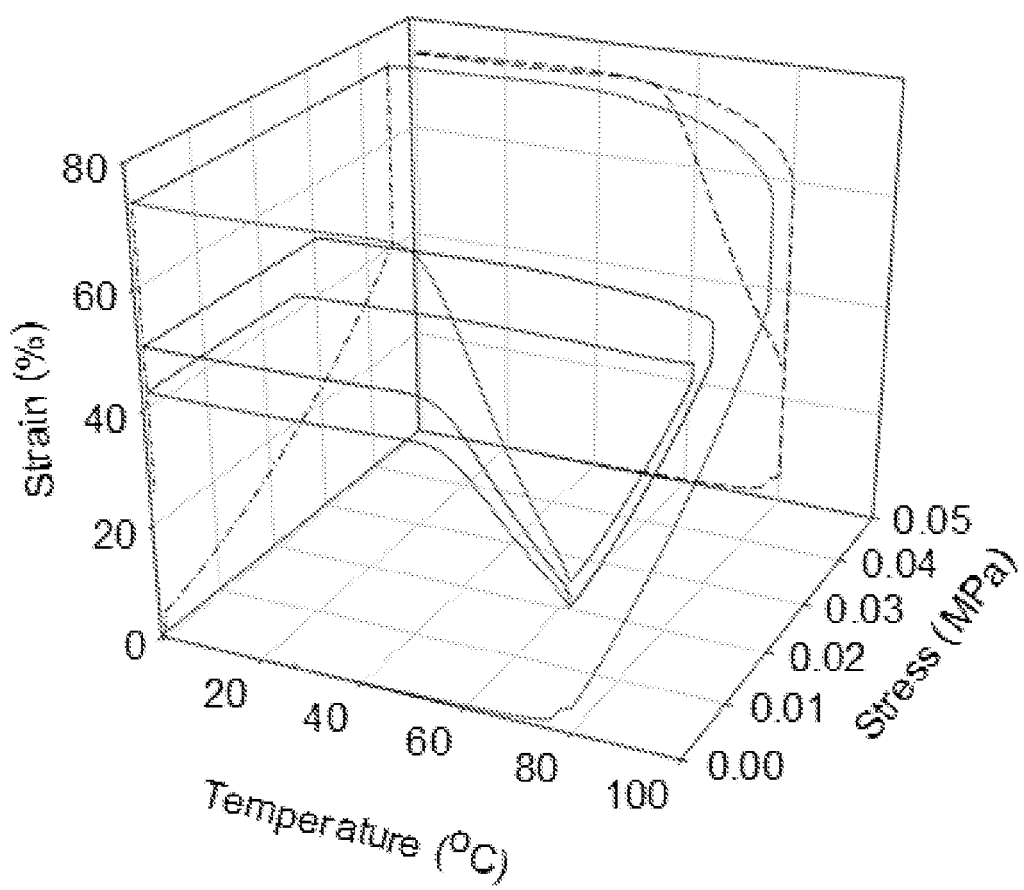
Figure 16:
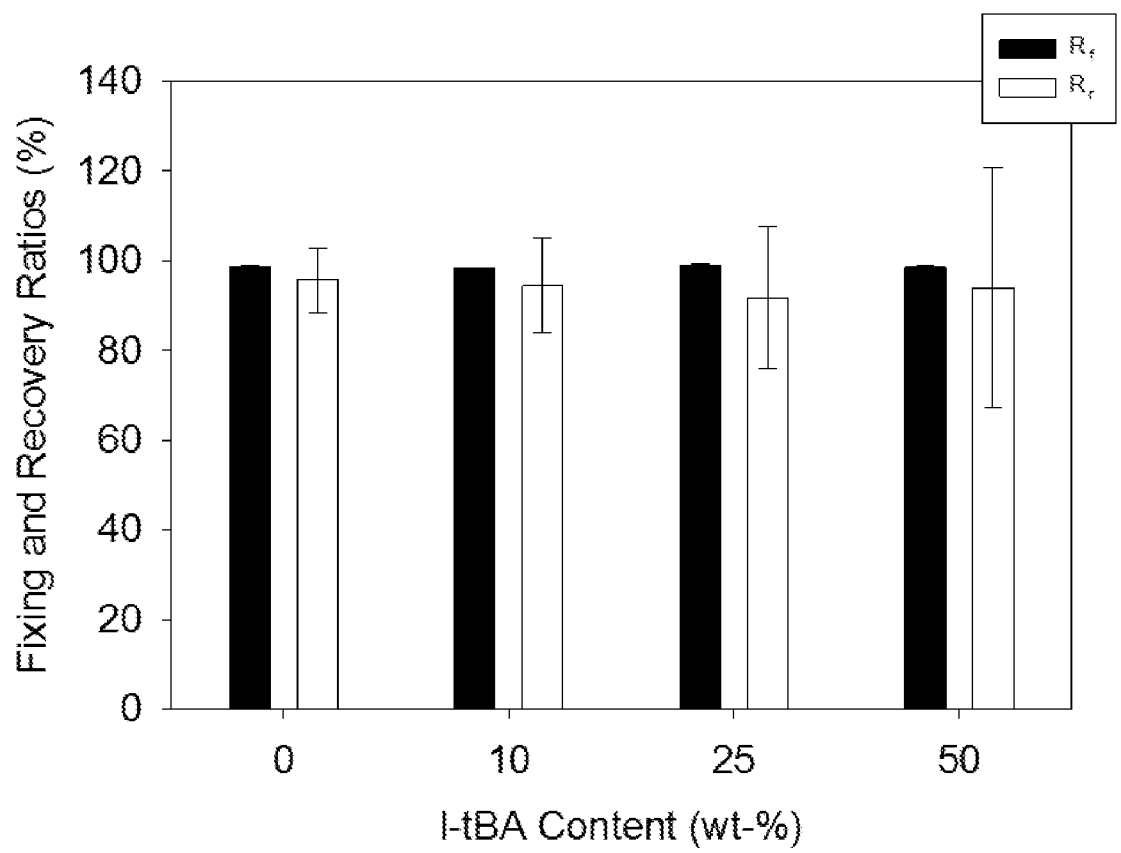
Figure 17:
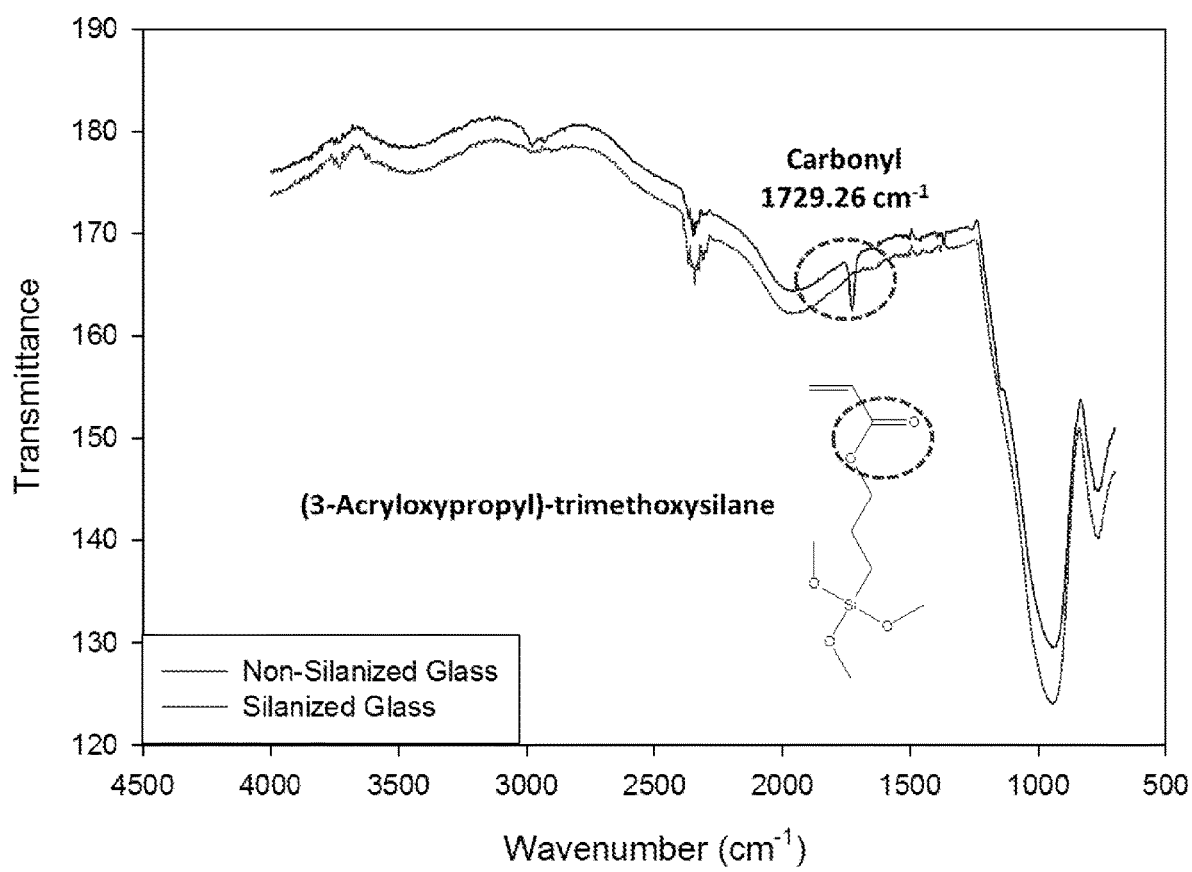
Figure 18:
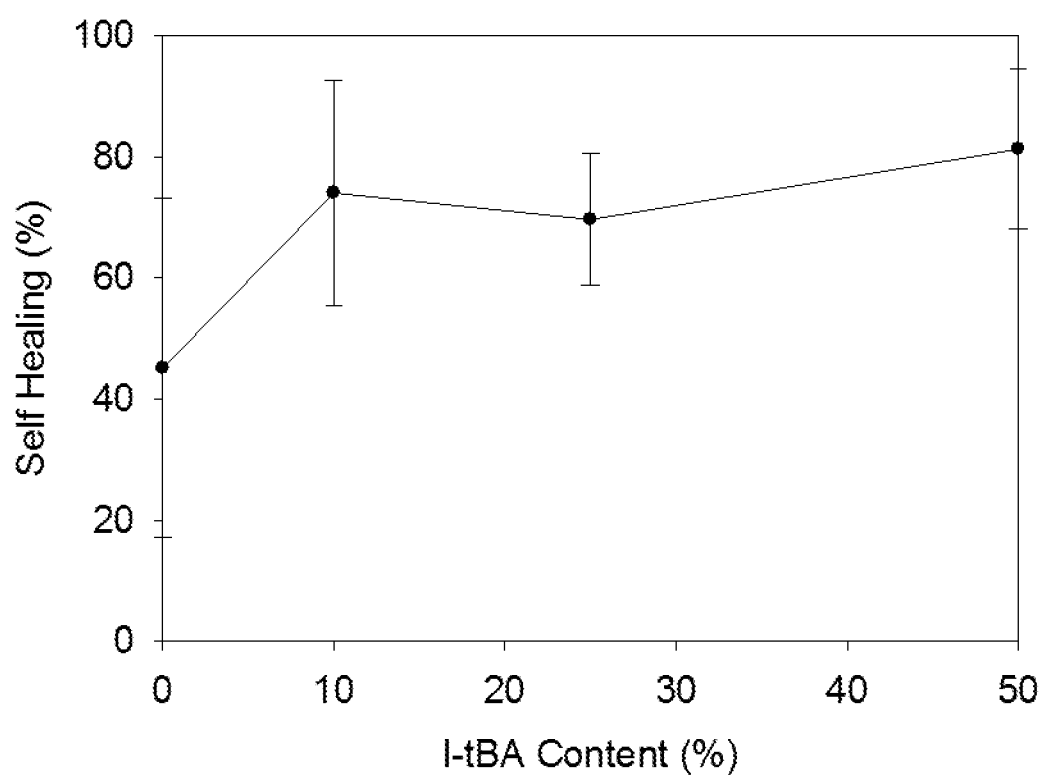
Figure 19:
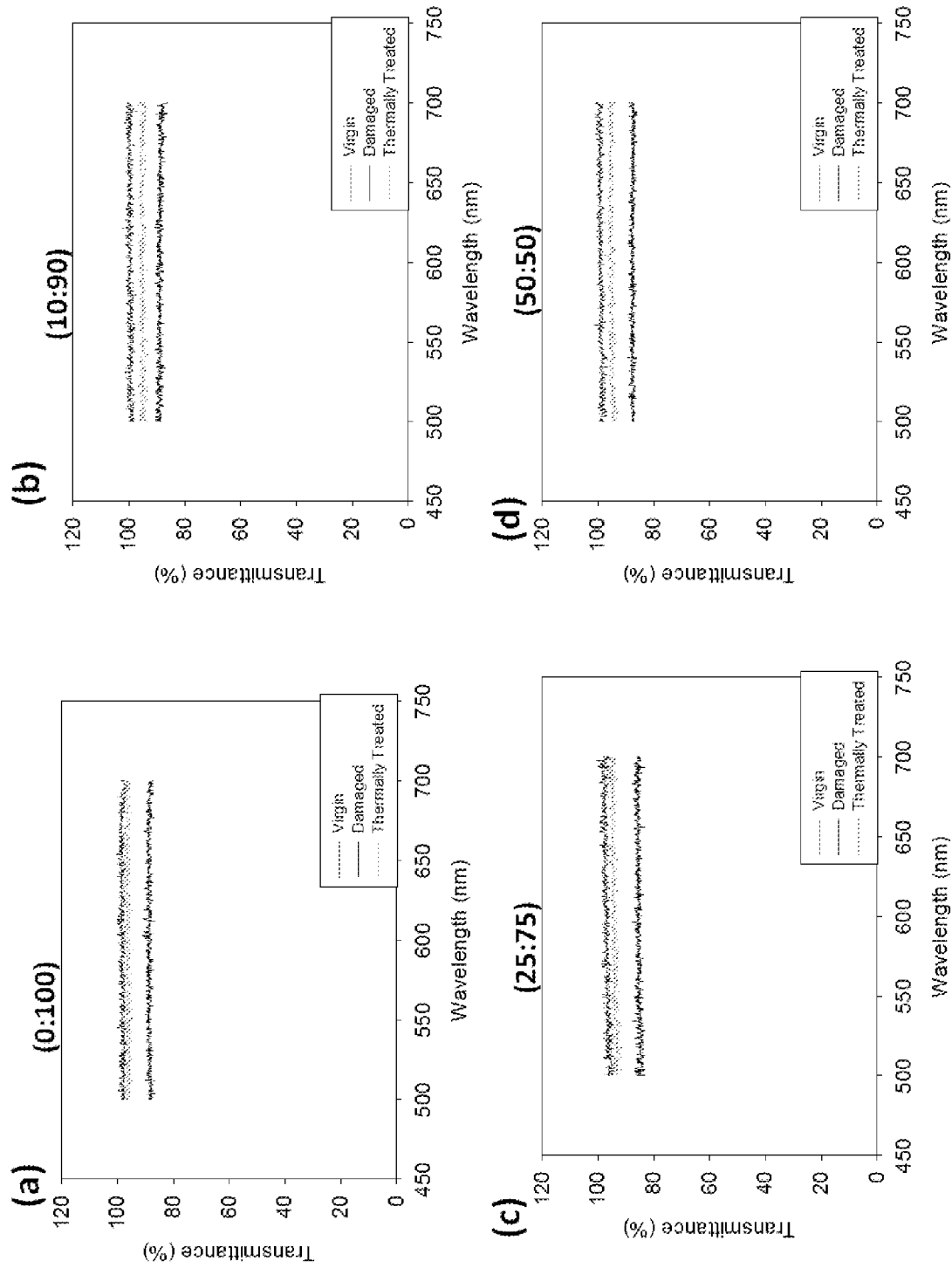
Figure 20:
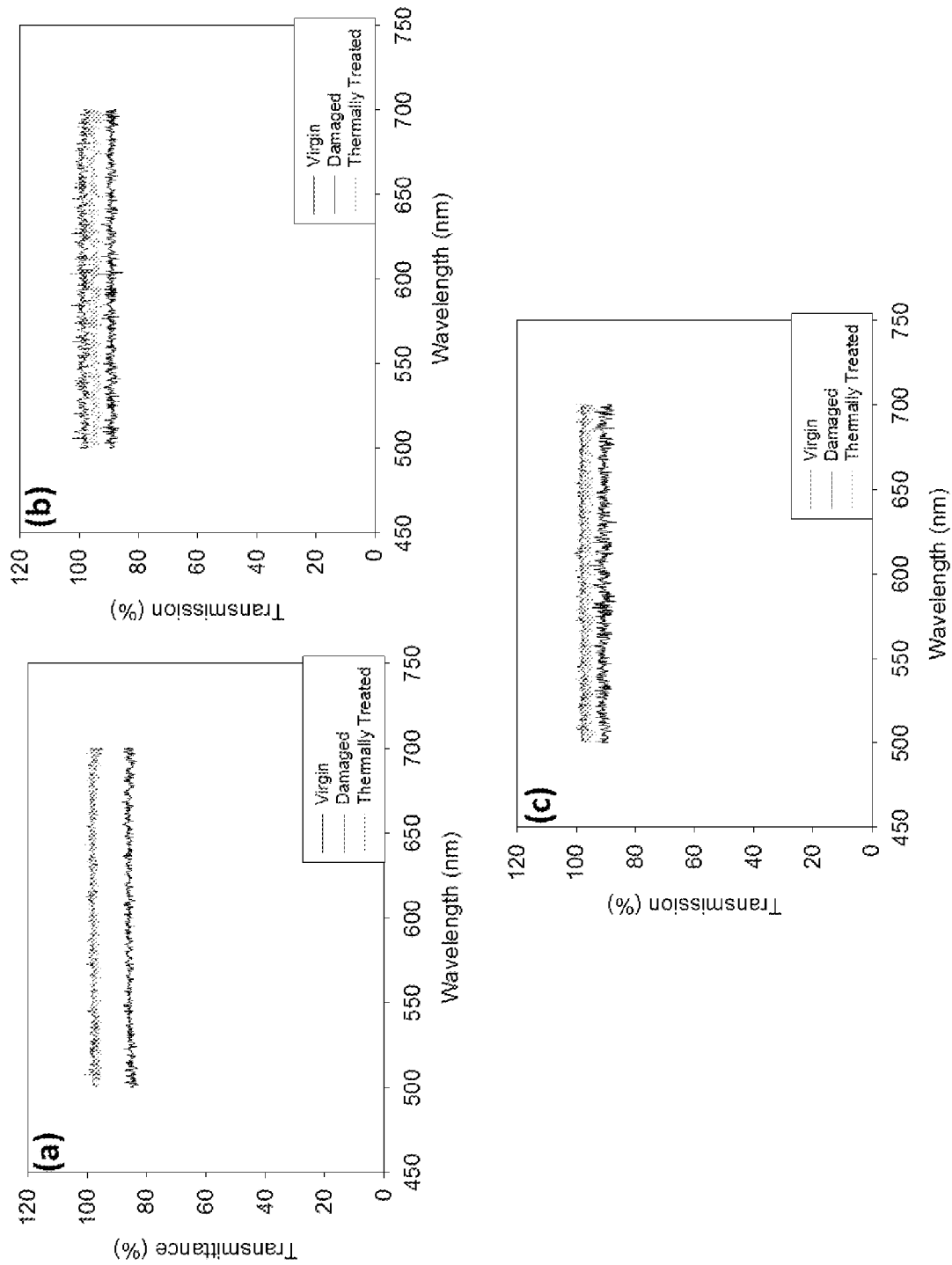
Figure 21:
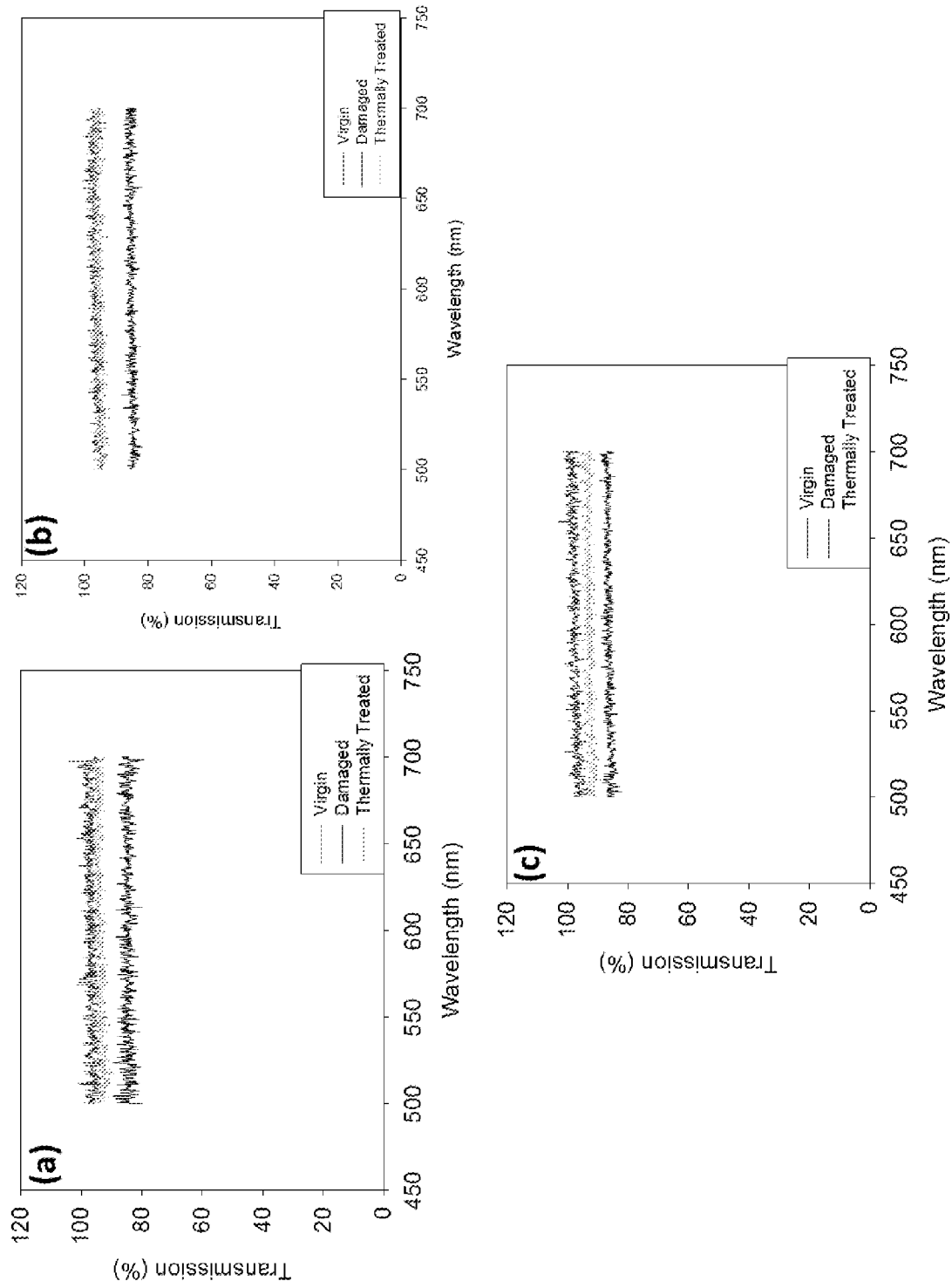
Figure 22:
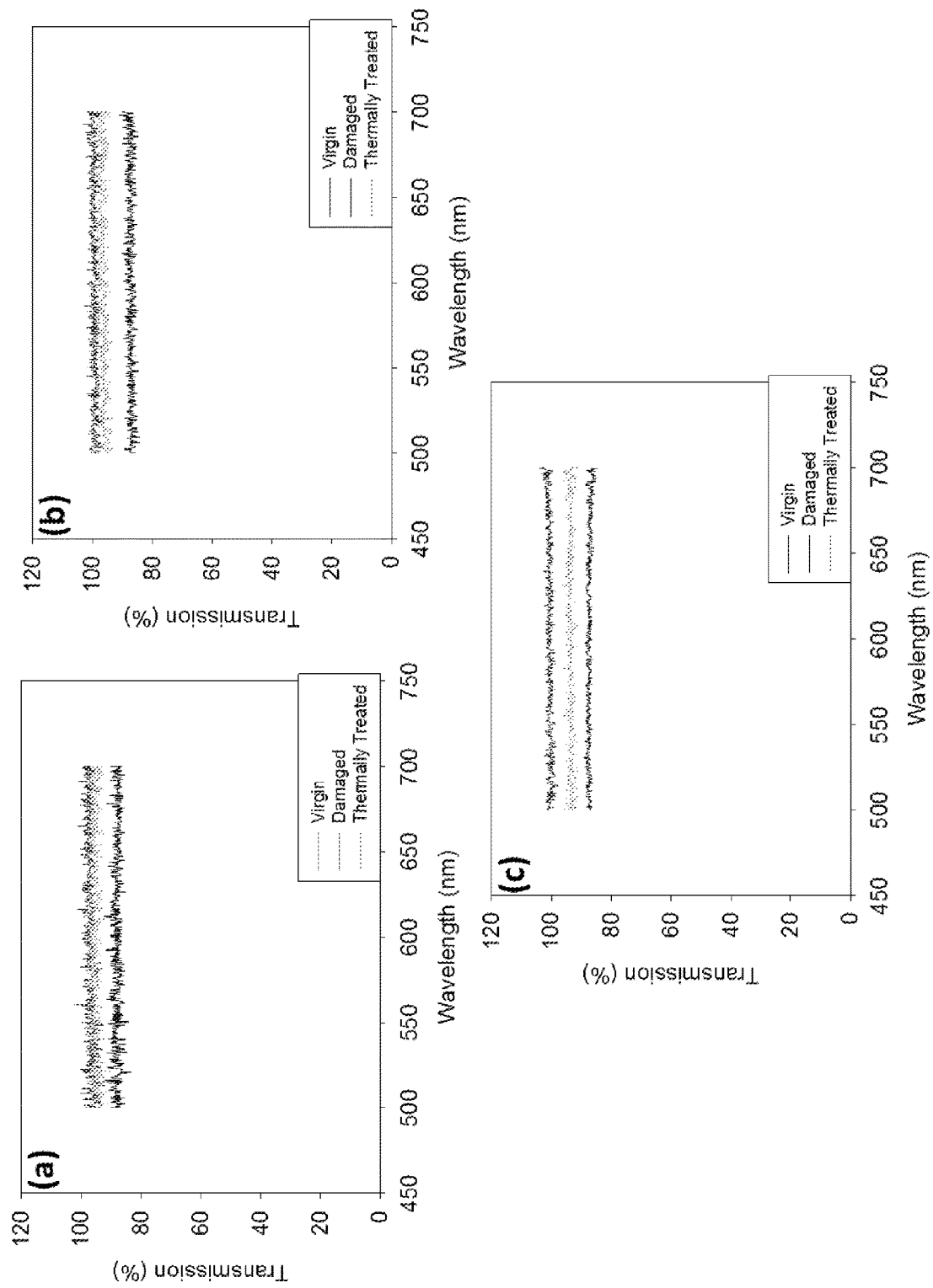

FIG. 15A is a one-way shape memory (1WSM) curve for 0:100 1:n-tBA compositions where a 1 mm thick rectangular specimen was thermally treated at 120° C. for 10 min and cooled at RT for 10 min prior to testing, with strain vs temperature in a back plane and stress vs strain curves on a side plane;

FIG. 15B is a 1WSM curve for 10:90 1:n-tBA compositions where a 1 mm thick rectangular specimen was thermally treated at 120° C. for 10 min and cooled at RT for 10 min prior to testing, with strain vs temperature in a back plane and stress vs strain curves on a side plane;

FIG. 15C is a 1WSM curve for 25:75 1:n-tBA compositions where a 1 mm thick rectangular specimen was thermally treated at 120° C. for 10 min and cooled at RT for 10 min prior to testing, with strain vs temperature in a back plane and stress vs strain curves on a side plane;

FIG. 15D is a 1WSM curve for 50:50 1:n-tBA compositions where a 1 mm thick rectangular specimen was thermally treated at 120° C. for 10 min and cooled at RT for 10 min prior to testing, with strain vs temperature in a back plane and stress vs strain curves on a side plane;

FIG. 16 is a graph of the fixing ($R_f$) and recovery ($R_r$) ratios for all 1:n-tBA compositions tested for 1WSM experiments;

FIG. 17 is a graph of showing transmittance vs wavelength to investigate the carbonyl group present on silanized glass slide using FTIR-ATR;

FIG. 18 is a graph showing self-healing efficiency as a function of tBA thermoplastic content among all 1:n-tBA compositions tested;

FIG. 19 is a series of graphs showing the transmittance vs wavelength trend among the average of three samples tested for each 1:n-tBA composition for coatings in their virgin, damaged and thermally treated states, with the following compositions shown: (a) (0:100), (b) (10:90), (c) (25:75), and (d) (50:50);

FIG. 20 is a series of graphs showing transmittance vs wavelength for the 1:n-tBA coatings in their virgin, damaged, and thermally treated states, where three (0:100) samples were tested and (a) shows Run 1, (b) shows Run 2, and (c) shows Run 3;

FIG. 21 is a series of graphs showing transmittance vs wavelength for the 1:n-tBA coatings in their virgin, damaged, and thermally treated states, where three (10:90) samples were tested and (a) shows Run 1, (b) shows Run 2, and (c) shows Run 3;

FIG. 22 is a series of graphs showing transmittance vs wavelength for the 1:n-tBA coatings in their virgin, damaged, and thermally treated states, where three (25:75) samples were tested and (a) shows Run 1, (b) shows Run 2, and (c) shows Run 3.

DETAILED DESCRIPTION OF THE INVENTION

Figure 1:
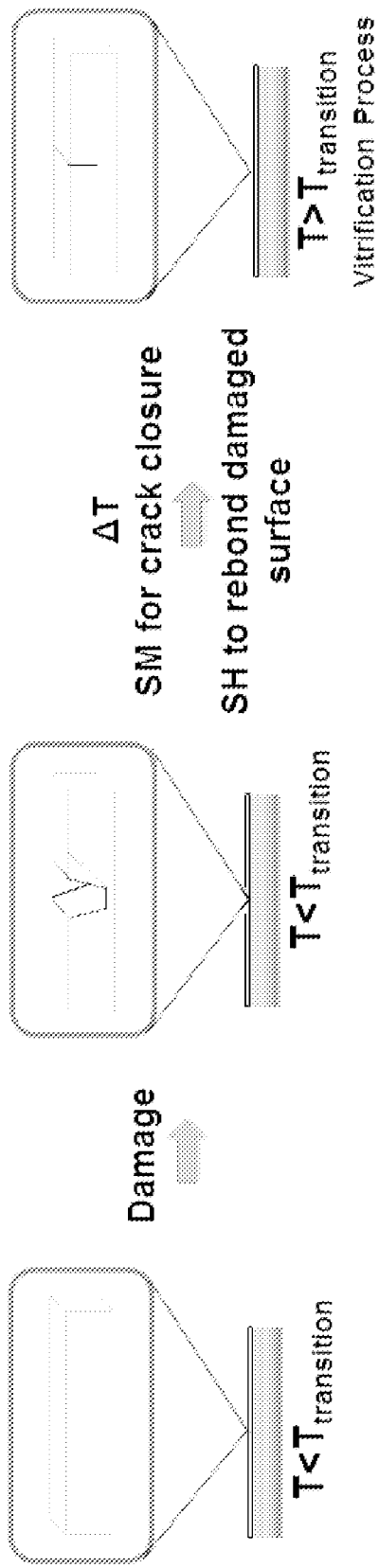
FIG. 1 is a schematic of an amorphous SMASH coating according to the present invention.

Referring to FIG. 1, the present invention comprises an amorphous, optically transparent, colorless shape memory assisted self-healing (SMASH) system that may be used as a coating for optical glassware applications. The system employs a combination of surface shape memory and self-healing properties to repair damaged sites on glass substrates when exposed to a thermal stimulus. The coating includes a miscible combination of a network polymer and a linear polymer having a $T_g$ between room temperature and about 40 degrees C. The shape memory phenomena of the coating are used for crack closure and the macromolecular diffusion of the linear polymer provides rebonding of the crack.

A thin coating of the system may be applied as a liquid to a substrate and then cured by application of heat or ultraviolet light. Scratching of the coating (for example, by a razor blade) causes the creation of new surfaces due to cohesive failure as well as stored elastic energy (stress) due to compression of the crosslinked polymer. Heating of the coating leads to release of the stored energy while also tackifying the surfaces so that the crack closes and then rebonds until the damage is no longer evident. The present invention thus takes advantage of the shape memory effect for crack closure and to provide a minimum amount of healing material needed for rebonding any damage, combined with self-healing effects to restore the optical characteristics of the coating as originally provided. The system may be used as a coating for corrective eyewear, for windshields and windows in automobiles and motorcycles, as well for as optical coatings wherever needed.

More specifically, the system comprises a single amorphous phase having a first network polymer component and a second linear polymer component. Generally, the first and second components may comprise any combination of network and linear polymers that are miscible and have a $T_g$ between room temperature and about 40 degrees C.

For example, the network polymer component may comprise homopolymers and copolymers containing one or more of the following monomers combined to achieve a $T_g$ in the range $20<T_g<40°$ C.: vinyl chloride, vinyl butyral, vinyl fluoride, vinyl pivalate, 2-vinylnaphthalene, 2-vinylpyridine, 4-vinyl pyridine, vinylpyrrolidone, n-vinyl carbazole, vinyl toluene, vinyl benzene(styrene), methyl methacrylate, ethyl methacrylate, acryl-functionalized POSS, methacryl-functionalized POSS, vinyl ethyl ether, vinyl laurate, vinyl methyl ether, vinyl propionate, alkyl acrylates, alkyl methacrylates, crosslinked with any multifunctional comonomer (polymerization functionality>1), including ethylene glycol dimethacrylate, diethylene glycol dimethacrylate, polyethylene glycol dimethacrylate, polyethylene glycol dimethacrylate; propoxylated neopentyl glycol diacrylate, 1,3-butanediol dimethacrylate, 1,4-butanediol diacrylate, 1,4-butanediol dimethacrylate, glyceryl proxy triacrylate, pentaerythritol tetraacrylate, tetraethylene glycol dimethacrylate, multiacryl-POSS and multimethacryl-POSS.

The linear polymer component may comprised of homopolymers and copolymers containing one or more of the following monomers combined to achieve a $T_g$ in the range $20<T_g<40°$ C. and to be miscible with the network polymer: vinyl chloride, vinyl butyral, vinyl fluoride, vinyl pivalate, 2-vinylnaphthalene, 2-vinylpyridine, 4-vinyl pyridine, vinylpyrrolidone, n-vinyl carbazole, vinyl toluene, vinyl benzene(styrene), methyl methacrylate, ethyl methacrylate, acryl-functionalized POSS, methacryl-functionalized POSS, vinyl ethyl ether, vinyl laurate, vinyl methyl ether, vinyl propionate, alkyl acrylates, alkyl methacrylates.

These components may be combined by dissolution of the linear polymer into a liquid mixture of the network polymer monomers, crosslinker, and any polymerization initiator known in the art. This miscible blend can be homogenized by stirring and application of heat. Once homogenized, the system can be applied to a coating and cured by application of light or heat.

The coating can be applied to a glass substrate via a three step process. The first step is the silanization of the substrate. Prior to silanization, the glass substrate is placed in a piranha solution comprised of sulfuric acid and hydrogen peroxide, which is heated for one hour (safety precautions are required for this cleaning step). This process hydrolyzes the surface of the glass, and removes organic impurities. Following the hydroxylation process, the substrate is then silanized using a solution of ethanol and deionized water acidified with acetic acid. One percent by volume of (3-acryloxypropyl) trimethoxysilane is added and the substrate is placed in solution and agitated manually. The substrate is then rinsed in fresh ethanol and the coupling agent cured in a convection oven. Silanization promotes better adherence of the polymer coating to the glass substrate and prevents delamination from occurring during damage.

After silanization, the coating is fabricated, such as by making a solution of tert-butyl acrylate (tBA) monomer, butyl acrylate (BA) monomer, 2-2' azobisisobutyronitrile (AIBN), and triethylene glycol dimethyl acrylate (TEGDMA). This solution is stirred mechanically while a ShimStock 12 μm thick spacer is cut.

Finally, the solution is syringed between the silanized substrate with the spacer in the middle and a RainX-treated glass substrate is placed on top. The sample is secured together, such as by using binder clips along the edges, and is cured via ultra violet (UV) irradiation. Once cured, the SMASH coating may be evaluated, such as by scratch testing and subsequent heating to stimulate SMASH, to quantify healing.

Figure 2:
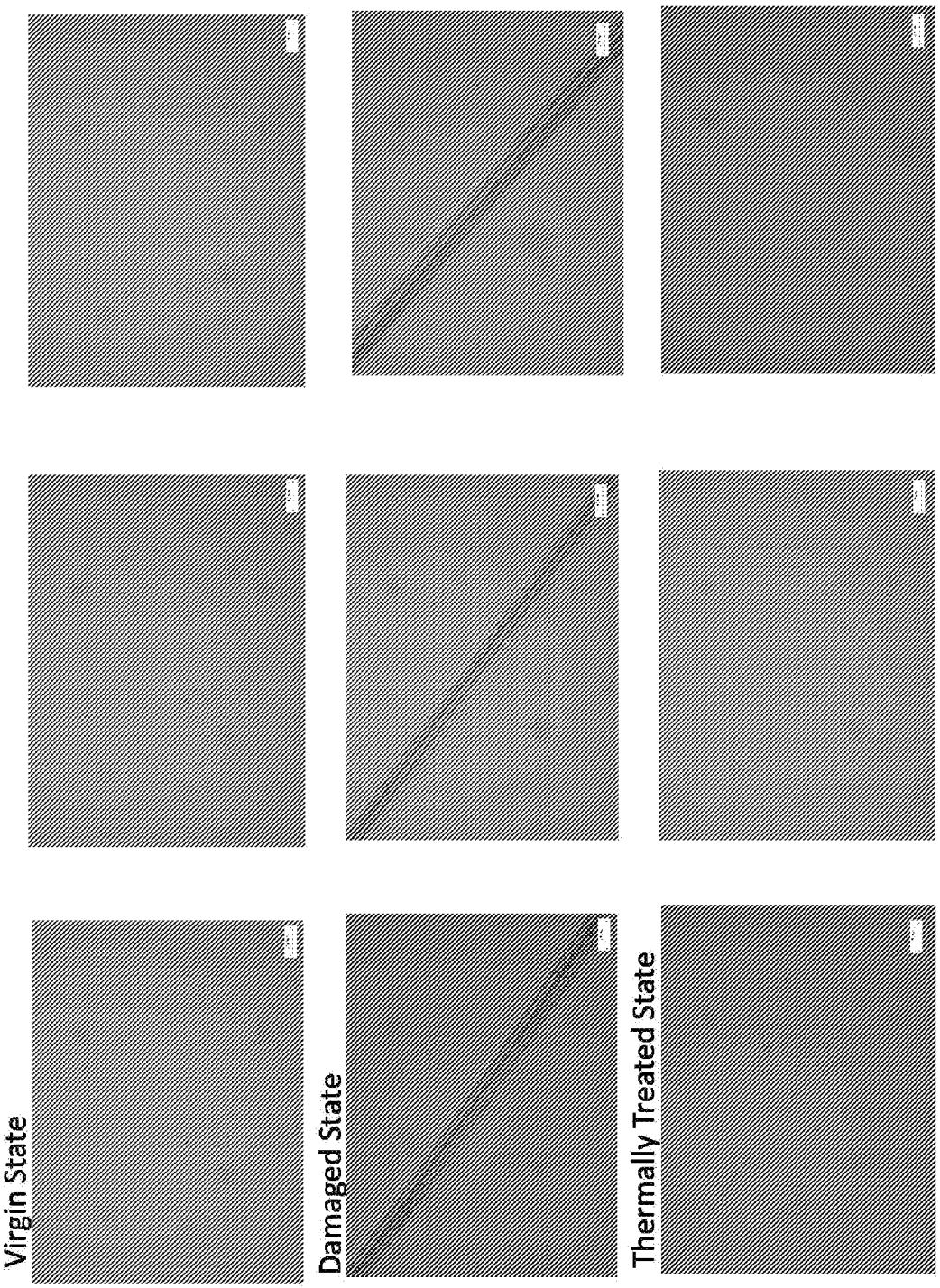
FIG. 2 is a series of representative optical micrographs of a coating according to the present invention in the virgin, damaged, and healed states.

Testing of exemplary coatings has established the benefits of the present invention. For example, prior to damaging, the coating is placed in its virgin state in a 120° C. convection oven for thermal history removal. As seen in FIG. 2, optical microscope images illustrate pre-damaged samples featuring damage produced by scratching the sample with a razor blade in a custom scratching machine, and then post-scratched samples after exposure to a thermal stimulus in a convection oven to reach the thermally treated state of the coating. Self-healing efficiency may be measured by analyzing the optical micrographs using software, such as the ImageJ image processing program.

EXAMPLE

A new amorphous coating was created where tert-butyl acrylate (tBA) was selected to form a tBA shape memory (SM) network and tBA self-healing (SH) thermoplastic to fabricate a thin coating on glass substrates for scratch repair on optical surfaces. Upon damage at room temperature (RT), the scratched coatings were heated above their $T_g$, which is well above RT, to initiate the surface SM effect and allow for crack closure. The SM effect allows for crack surface contact where the SH agent molecularly diffuses across the damaged site where it is then cooled to RT to complete the healing process through vitrification of the polymer chains, as seen in FIG. 1. The SM network and SH agent weight percentages were varied to optimize both effects. Films were used to conduct thermal and thermo-mechanical testing where the coatings were fabricated to conduct scratch testing and transmittance studies.

Tert-butyl acrylate, (tBA) monomer (98% pure) (molecular weight of 128.17 g/mol), Tetrathyleneglycol dimethacrylate (TEGDMA) crosslinker (molecular weight of 330.37 g/mol), and Azobisisobutyronitrile (AIBN) (98% pure) photo initiator (molecular weight 164.21 g/mol) were purchased from Sigma Aldrich. The tBA monomer contained 10-20 ppm monomethyl ether hydroquinone inhibitor in order to reduce the degree of polymerization, oxidation and darkening during storage. An SDHR-4 distillation (Scientific Polymer Products, INC) column was used to remove the inhibitor to purify the tBA monomer. TEGDMA, AIBN, methanol, (3-acryloxyproply) trimethoxysilane (coupling agent) and Tetrahydrofuran (THF) were used as purchased.

Figure 3:
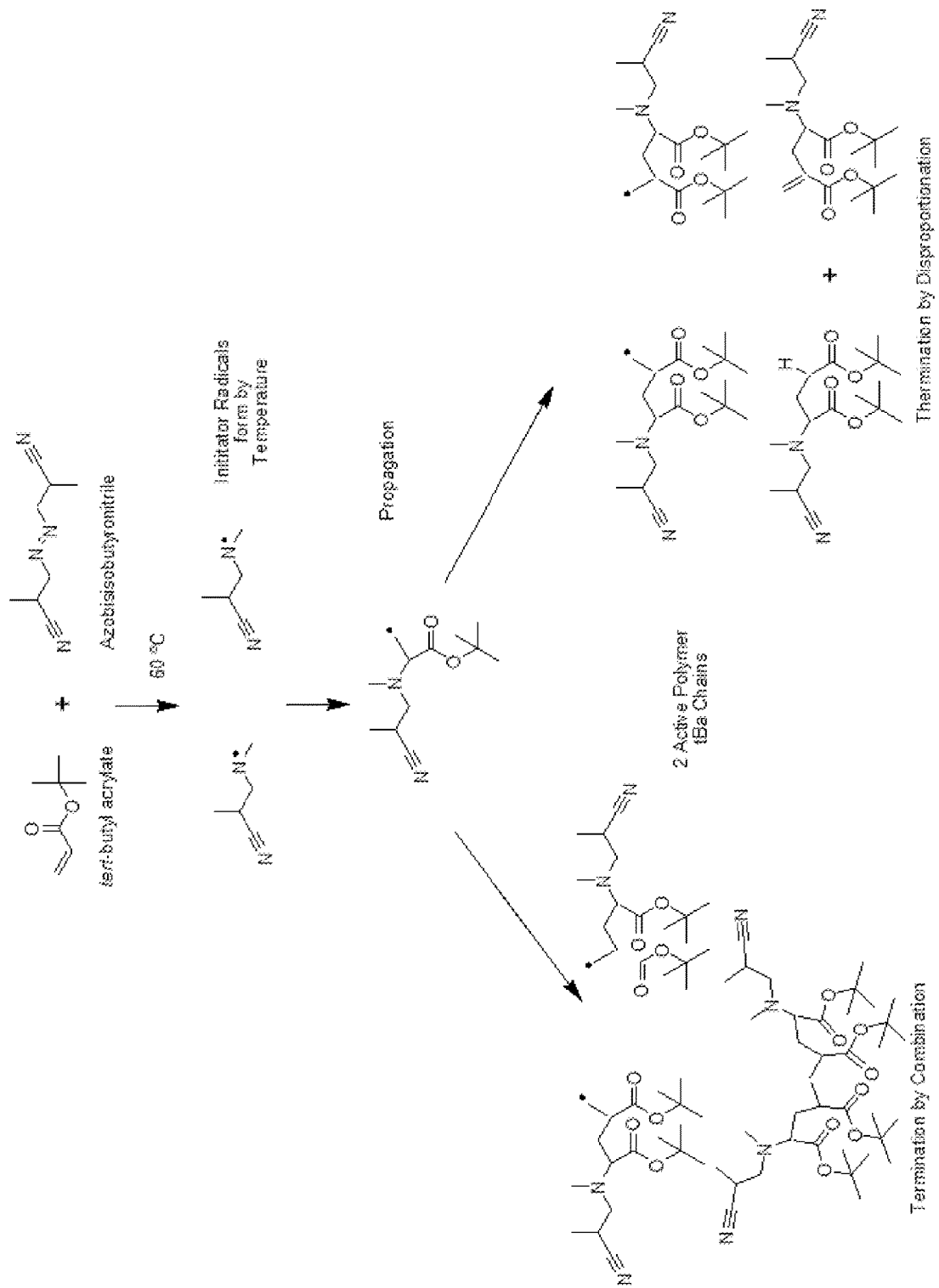
FIG. 3 is a schematic of the preparation of the tBA thermoplastic (SH agent) synthesis through the thermal initiated free radical polymerization process.
Figure 4:
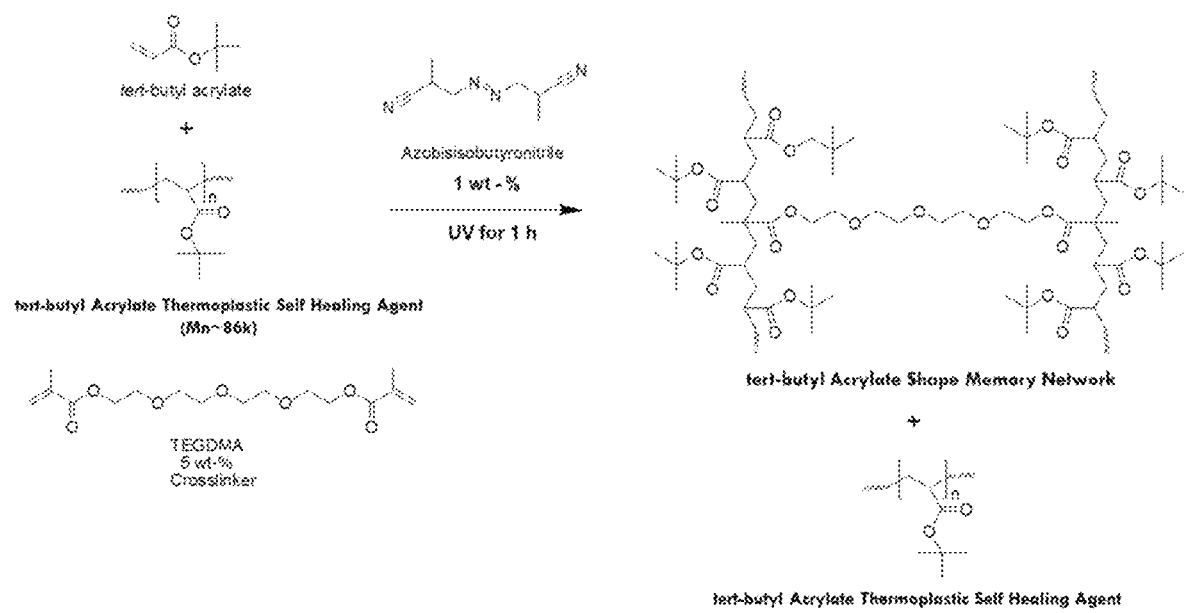
FIG. 4 is a schematic showing the preparation of tBA SMASH films by UV initiated polymerization process with a representative image of a film to show the transparency property.

A thermal initiated free radical polymerization process was conducted to synthesize tBA thermoplastic, which served as the SH agent for the SMASH system. 10 mL (8.33 g) of tBA monomer and 0.083 g (1 wt-%) AIBN (photo initiator) were dissolved in 20 mL distilled toluene. Toluene was used because it was miscible with the tBA monomer, has a high boiling point of 110° C. and also reduced the degree of the Trommsdorff effect (autoacceleration in the polymerization rate where it increases local viscosity leading to an unstable free radical polymerization process). The reaction was conducted at 70° C. under nitrogen purge and constant magnetic stirring for 6 h. The solution was precipitated using a BUCHI R-210 rotary evaporator at 55° C. and rotated at a rate of 20 RPM. This step was conducted in order to extract the toluene from the solution. The resulting viscous solution was dissolved in 30 mL anhydrous tetrahydrofuran (THF) followed by re-precipitation in a 150 mL methanol/150 mL water solution to yield the desired tBA thermoplastic. The thermoplastic was left under the fume hood for 24 h to dry and was further dried for 24 h under vacuum at 45° C. FIG. 3 shows the tBA thermoplastic synthesis for a thermal initiated free radical polymerization process. TGA analysis was then conducted to confirm complete solvent removal and dryness of the thermoplastic. Gel Permeation Chromatography (GPC) analysis was conducted to determine number-average molecular weight ($M_n$), weight-average molecular weight ($M_w$) and polydispersity index (PDI). The values are reported in Table 1 below.

l-tBa:n-tBA films were made by forming the SM network through free radical polymerization in the presence of the synthesized tBA thermoplastic. This was done by crosslinking the tBA monomer with TEGDMA (5 wt-% of tBA monomer) where AIBN (1 wt-% of tBA monomer) formed free radicals to initiate the polymerization process. The tBA thermoplastic was not covalently crosslinked with the shape memory network, but simply randomly inter-coiled within the network to form a semi-interpenetrating polymer network (SIPN). A solution of tBA monomer, tBA thermoplastic, TEGDMA crosslinker, and AIBN photo initiator was prepared in a 20 mL vial and stirred at RT on a magnetic stirrer until the thermoplastic completely dissolved to make a homogeneous solution. No solvent was added to the solution as the thermoplastic powder dissolved in the presence of the tBA monomer. The solution was then syringed in a glass mold made of two 75 (l)×25 (w)×1 (th) mm glass slides where a 1 mm thick Teflon spacer was positioned in between the two glass slides and binder clipped together. The glass slides were first pre-treated with RainX prior to syringing the solution to ensure the cured films did not adhere to the glass slides to prepare films (not coatings) for testing purposes. Ultraviolet (UV) irradiation was then used for 1 h at RT to cure tBA SMASH films. This was done by placing the samples in an enclosed box that contained an upper and lower 60 W UV lamp with a wavelength of 352 nm in order to allow for uniform curing. Each sample was then removed from the glass molds and placed in individual bags. FIG. 4 shows the preparation of the tBA SMASH systems via the UV initiated polymerization process. The weight percentages (wt-%) of the tBA monomer and thermoplastic were varied to fabricate the following compositions (l-tBA$_{wt-\%}$:n-tBA$_{wt-\%}$): 1-tBA$_0$:n-tBA$_{100}$, 1-tBA$_{10}$:n-tBA$_{90}$, 1-tBA$_{25}$:n-tBA$_{75}$, and 1-tBA$_{50}$:n-tBA$_{50}$. The wt-% were varied in order to optimize both the SM and SH effects.

Degree of SM network formation was evaluated by gel fraction measurements. A small cured sample from each composition weighing (pre-extraction) 21.8±3.0 mg was submerged in 20 mL of methanol. Each sample was agitated in a shaker at 60 RPM at 25° C. for 24 h. This process allowed for the extraction of the linear tBA thermoplastic and unreacted tBA monomer from the SM network. After 24 h, the sample was then washed using fresh methanol to remove any polymer from the surface and dried at 40° C. for 24 h in a vacuum oven. The samples were than weighed again to compare the weights pre- and post extraction. This procedure was done three times on three different samples for each composition to obtain statistical reproducibility. Gel Fraction (G(%)) was calculated using the following equation:

$$G(\%) = \frac{m_d}{m_i} \times 100\% \qquad (1)$$

where G(%) is the gel fraction percentage, $m_i$ is the initial dry weight before extraction and $m_d$ is the dry weight after extraction. This equation calculated the amount of SM network formed.

Thermogravimetric Analysis (TGA) was conducted to obtain the onset degradation temperature for all compositions made. All samples weighing 4.0±0.6 mg were heated at 600° C. at 10° C./min using a TA Q500 TGA instrument. The experiments were conducted under constant nitrogen purge and the sample decomposition by weight loss as a function of temperature was recorded. The onset drop off point was obtained between the designated temperatures. Three different samples were tested from each composition for statistical reproducibility.

Differential Scanning calorimetry (DSC) experiments using a TA Q200 DSC were conducted to observe the $T_g$ regions for each composition tested. Each sample weighing 4.0±0.7 mg was first equilibrated to −85° C., isothermally held for 1 min, then heated at 150° C. at 10° C./min, held isothermally for 1 min, cooled from 150° C. to −50° C. at 10° C./min, isothermally held for 1 min, and heated again to 150° C. at 10° C./min. An exothermic peak was evident on the first heating which indicated the films were not completely cured. Therefore, the samples were post cured at 120° C. for 10 min in a convection oven and cooled at RT for 10 min to completely cure. This was confirmed by running DSC before and after the post cure treatment. Each sample was then tested three times for reproducibility.

Thermo-mechanical characterization was conducted using a TA Q800 Dynamic Mechanical Analyzer (DMA). Each sample was cut from a cured film in a rectangular geometry where the sample had average dimensions of 7.0±1.1 (l)×2.0±0.3 (w)×0.9±0.1 (th) mm. Each sample was loaded under tension using tensile film clamps in the DMA apparatus. The tensile storage modulus vs temperature was recorded where the thermal transitions were observed in order to study the viscoelastic properties of the compositions. This was done by applying an oscillatory tensile deformation with a displacement amplitude of 15 μm (tensile strain<0.4%), a frequency of 1 Hz, a force track (ratio of static to dynamic forces) of 108%. Each sample was first heated to an equilibrium temperature of 120° C. to remove the thermal history, then ramped to −50° C. at 3° C./min, held isothermally for 5 min, and finally heated to 120° C. at 3° C./min. The tensile storage modulus (E') of the second heating was reported. Each sample of each composition was tested three times for statistical reproducibility. The tensile storage modulus at 25° C., 60° C., and 100° C. were also reported to study the tensile storage modulus change as a function of temperature. These three temperatures were chosen to identify the thermomechanical properties during the following three states: glass at 25° C., transition at 60° C., and rubber at 100° C.

A new characterization referred to as reversible plasticity shape memory (RPSM) was used to characterize the invention. RPSM was developed to characterize the reversal of plastic deformation in shape memory polymers (SMP) which most materials are incapable of exhibiting. RPSM is a five-step thermo-mechanical method conducted on the DMA. RPSM was conducted on all compositions using a dogbone geometry following the ASTM Standard D638-03 Type IV (scaled down by a factor of 4, TestResources, Inc., Shakopee, MN) with an average thickness of 0.35±0.01 mm. All samples were first dogbone punched from cured films and heated at 120° C. for 10 min and cooled at RT to remove the thermal history. Each sample was then clamped using the tensile film fixtures where the temperature was equilibrated at RT and held isothermally for 1 min. The strain was then ramped to 30% at 5%/min to plastically deform the sample and this strain was held for 10 min (step 1-2). The strain was then ramped down at 5%/min until the static force reached 0.001 N in order to unload the sample and observe shape fixing (step 2-3). The sample was then heated from 25° C. to 80° C. at 3° C./min to allow shape recovery where this temperature was held isothermally for 5 min (step 3-4) then ramped back to 25° C. at 3° C./min to complete the RPSM cycle (step 4-5). This was conducted three times to obtain data reproducibility. The fixing ($R_f$) and recovery ($R_r$) ratios were then calculated by using the following equations:

$$R_f(N) = \frac{\varepsilon_u(N)}{\varepsilon_m(N)} \times 100\% \qquad (2)$$

$$R_r(N) = \frac{\varepsilon_u(N) - \varepsilon_p(N)}{\varepsilon_u(N) - \varepsilon_p(N-1)} \times 100 \qquad (3)$$

where $\varepsilon_m$, $\varepsilon_u$, $\varepsilon_p$ and N are the strain before unloading, the strain after unloading, permanent (unrecoverable) strain after shape recovery and the cycle number, respectively.

One way shape memory (1WSM), also referred to as conventional SM, was also conducted on the tBA systems testing a rectangular specimen where the average dimensions were 5.7±0.5 (l)×1.7±0.2 (w)×0.9±0.1 (th) mm. The samples were heated at 120° C. for 10 min and cooled at RT for 10 min prior to testing to remove the thermal history. The sample was clamped in the DMA using tensile fixtures and heated to 80° C., held isothermally for 1 min, and the strain was set to 0%. The force was then ramped to 0.5 N/min until 40% strain was achieved in order to elastically deform the sample and then held isothermally for 2 min. The temperature was then ramped from 80° C. to 0° C. at 3° C./min, and held isothermally for 5 min in order to temporally fix this deformation. The force was then ramped down to 0.001 N at 0.05 N/min and held for 2 min to observe the fixing properties of the sample. The sample was finally heated back to 80° C. to complete the 1WSM cycle. Three cycles were conducted for each 1-tBA:n-tBA system. The fixing and recovery ratios were calculated using equation 2 and 3 defined in the previous section.

In order to prepare self-healing coatings, glass substrates were subjected to hydroxylation and silanization to promote covalent bonding, and thus better adhesion, between the glass substrate and the tBA SMASH polymeric system. This was done by using a (3-acryloxypropyl) trimethoxysilane, 95% (Gelest, Inc.) coupling agent. First, 1 mm thick untreated soda-lime glass microscope slides were cleaned by rinsing with acetone followed by gently scrubbing with detergent soap and rinsing with deionized water. Hydroxylation of the glass slides was carried out through the use of a piranha solution of (2:1) sulfuric acid and hydrogen peroxide. This was done by preparing a solution of 26 mL sulfuric acid and adding 13 mL hydrogen peroxide dropwise while stirring with a glass rod. The piranha solution was used to remove surface impurities, leaving the natural hydroxyl groups on the glass available for bonding to the silane coupling agent. This solution was brought to 60° C. using a hot plate and the glass slides were submerged for 1 h ensuring that all slides were not touching each other to result in successful hydroxylization of the glass surfaces. The slides were then removed from the bath where they were thoroughly rinsed with deionized water, and dried under vacuum at RT until visibly dry.

Figure 5:
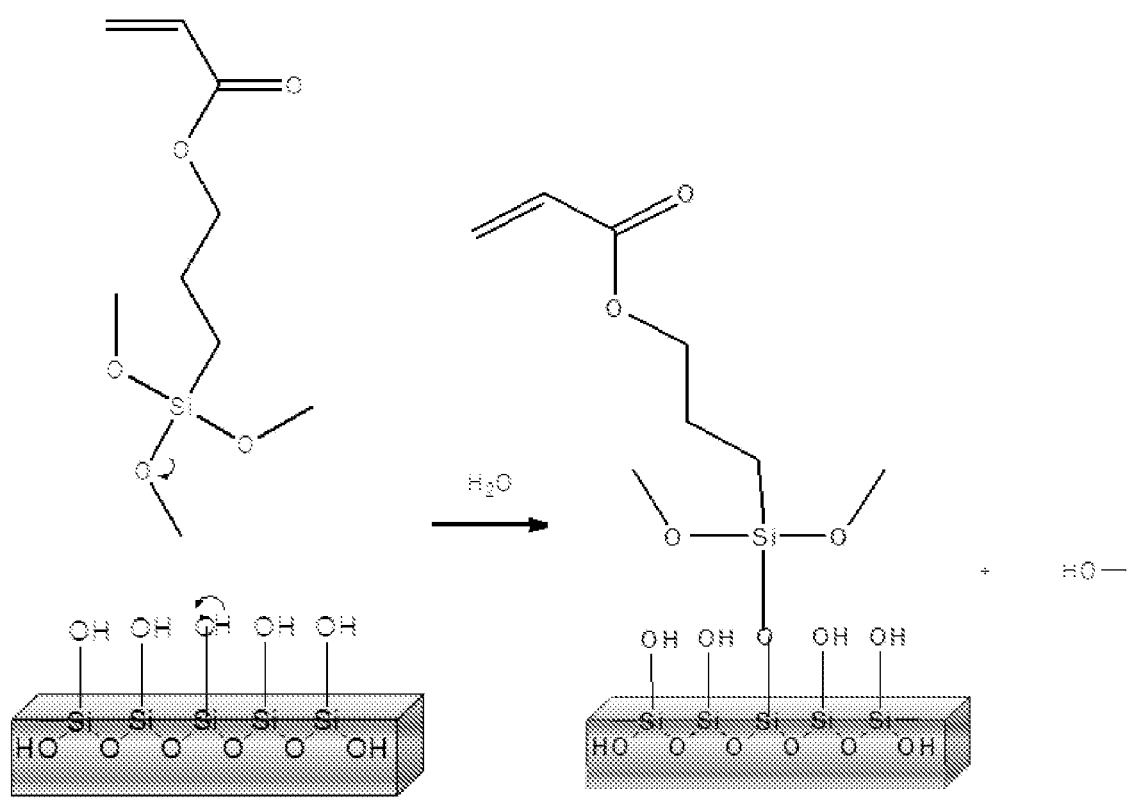
FIG. 5 is a schematic of the silanization process on the glass substrate.

Silanization was conducted following the hydroxylation process by preparing a (95:5) solution of ethanol and deionized water (38 mL ethanol and 2 mL deionized water). The solution was acidified to pH 4-5 using acetic acid, which was added drop-wise and tested using pH paper. Acetic acid was introduced to prevent polymerization of the coupling agent. 1-% by volume (0.4 mL) (3-acryloxyproply) trimethoxysilane, 95-% was added drop wise to the solution while stirring with a glass rod at RT for 5 min. The glass slides were submerged and the bath was agitated in a circular manner for 5 min. During this time, hydrolysis occurred, during which the methoxy groups on the end of the silane reacted with the newly formed hydroxyl groups on the substrate to form a covalently bonded layer of silane across the surface of the glass as seen in FIG. 5. This process produced methanol as a byproduct. The glass slides were then removed and rinsed thoroughly with fresh ethanol to remove excess, unbonded silane from the surface. The slides were then treated at 110° C. for 10 min in a convection isothermal oven in order to cure the silane layer formed on the glass substrate surface. This silanization process was adopted from the Gelest user guide. FTIR-ATR was conducted on non-silanized and silanized glass slides to evaluate the presence of the carbonyl group within the (3-acryloxyproply) trimethoxysilane coupling agent. FTIR-ATR was conducted in order to observe the presence of the carbonyl group.

Figure 6:
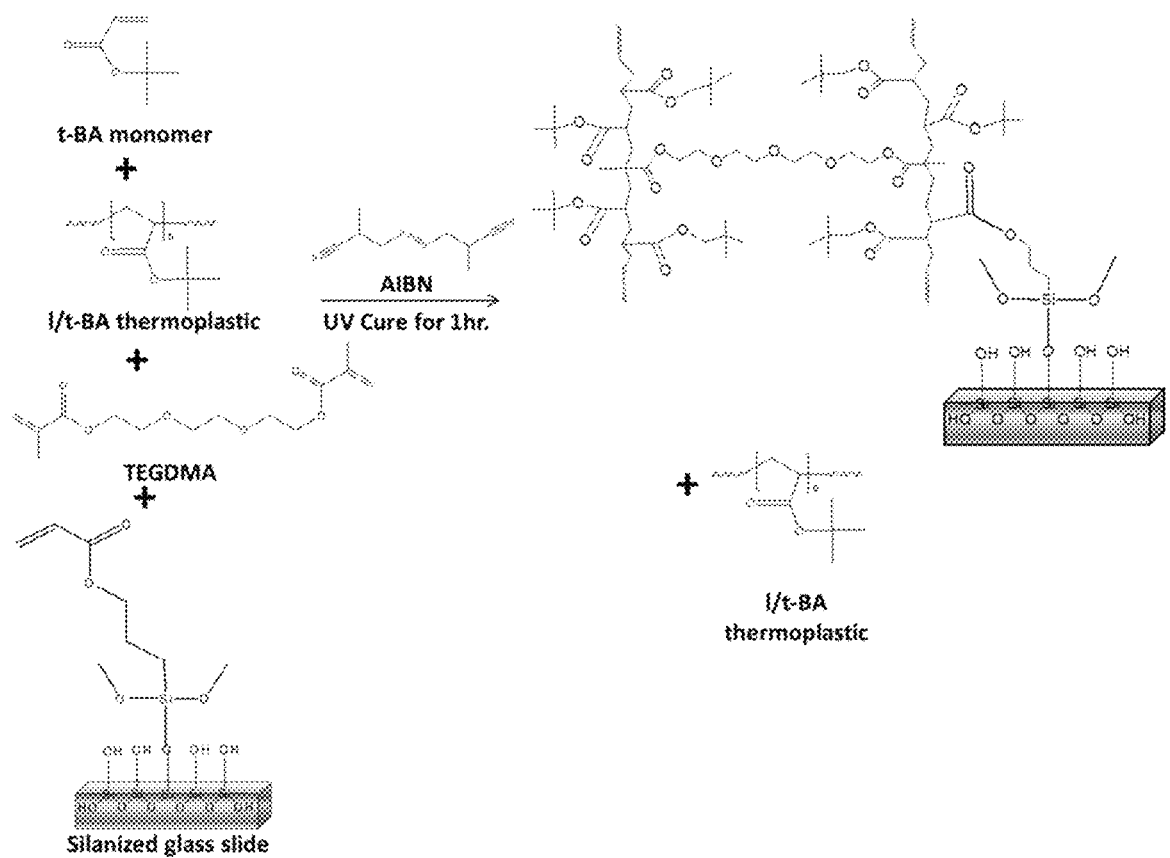
FIG. 6 is a schematic showing preparation of tBA SMASH coating using a silanized glass slide with a representative image of a coating on a glass substrate to show the transparency.

10 μm thick coatings were prepared on optical surfaces. This was done by UV curing a 1-tBA:n-tBA network on the chemically modified silanized glass substrate. The sample preparation and compositions detailed above were used to make coatings. The solution was syringed onto a silanized glass slide with a 10 μm thick spacer, which was pre-cut from a ShimStock sheet to the height and width of the slide. A second, non-silanized slide was then placed on top, sandwiching the liquid. The second slide was treated with RainX to prevent coating-glass adhesion on that mold surface. The slides were secured together with binder clips. The coatings were then UV cured for 1 h as seen in FIG. 6. The non-silanized glass slide was then removed to expose the 10 μm coating cured on the silanized glass substrate.

To test the amount of SH that occurred and optical transparency of the coatings, scratch tests analyzed with optical microscopy (OM) and spectrometer studies were carried out. OM imaging was conducted using an Olympus BX-51 polarizing microscope and Q Capture Pro software. Prior to scratching, the coating was heated to 120° C. for 20 min and cooled at RT for 20 min to remove the thermal history. The OM was calibrated for proper light alignment and image focusing. An OM micrograph of the coating in its virgin state at 10× magnification was captured. The sample was then scratched using a razor blade in a custom built motorized scratching machine at RT. The coating was firmly fastened into the sample holder and placed on the movable track. The track was connected to a motor that was attached to the back of the scratch machine. The motor is connected to a controller via wires where the user has the option to move the track forward or backward depending on the direction of damage that is desired. Each coating was scratched in a forward motion in order to form a uniaxial scratch where a track speed of 0.9 mm/sec was used. A second OM micrograph was then taken of the scratched coating. The damaged coating was then thermally treated by heating it in an isothermal oven at 120° C. for 20 min resulting in crack closure and healing through the SMASH effect. The coating was then cooled at RT for 20 min where a final OM micrograph was taken. This process was repeated four times for each composition to study reproducibility. OM images were used in evaluating the SH efficiency. This was done by importing all the OM micrographs in .TIFF format into the ImageJ software where in some cases the use of the paint tool to fill in the area of the scratch in black was performed for ease of analysis. The .TIFF images were then converted to an 8-bit format and saved as a .bmp. The images were then imported into Vision Assistant software, where the images were analyzed to obtain the area in pixels of the scratched and thermally treated coatings. This was done by making an analysis program containing a series of steps in the Vision Assistant software. First, a manual threshold on the images was conducted to isolate the area of the scratch (highlighted red) from the rest of the coating surface. The next step was to remove small objects from the image. The following step filled in the remaining areas in the scratched area in red. Finally, a histogram was created and an excel spreadsheet was produced that listed the overall area of the image, non-scratched, and scratched regions in pixels. The SH efficiency was defined as:

$$SH_{Efficiency}\ (\%) = \frac{A_{ss} - A_{TTS}}{A_{ss}} \times 100\% \qquad (4)$$

where $A_{SS}$ is the area in pixels of scratched surface and $A_{TTS}$ is the area in pixels of the thermally treated surface. A graph of SH efficiency vs tBA thermoplastic wt-% content was recorded for each composition tested.

Spectrometer studies were also carried out to quantify the transmittance of light through the virgin, damaged and thermally treated states of the coatings relative to a pristine glass surface. Following OM imaging of each l-tBa:n-tBA SMASH coatings, an Ocean Optics, Inc. spectrometer was attached to the OM microscope. OOIBase32 software was then used to analyze the percent transmittance of light through the coated glass at each of the states. To switch from absorbance to percent transmittance, a dark reference consisting of a razor blade covering the light source, and a reference consisting of a pristine glass slide was stored, giving the software a baseline to compare the coated samples to. A graph of transmittance vs wavelength was recorded for each composition. This process was conducted three times on each coating to obtain reproducibility.

Figure 7:
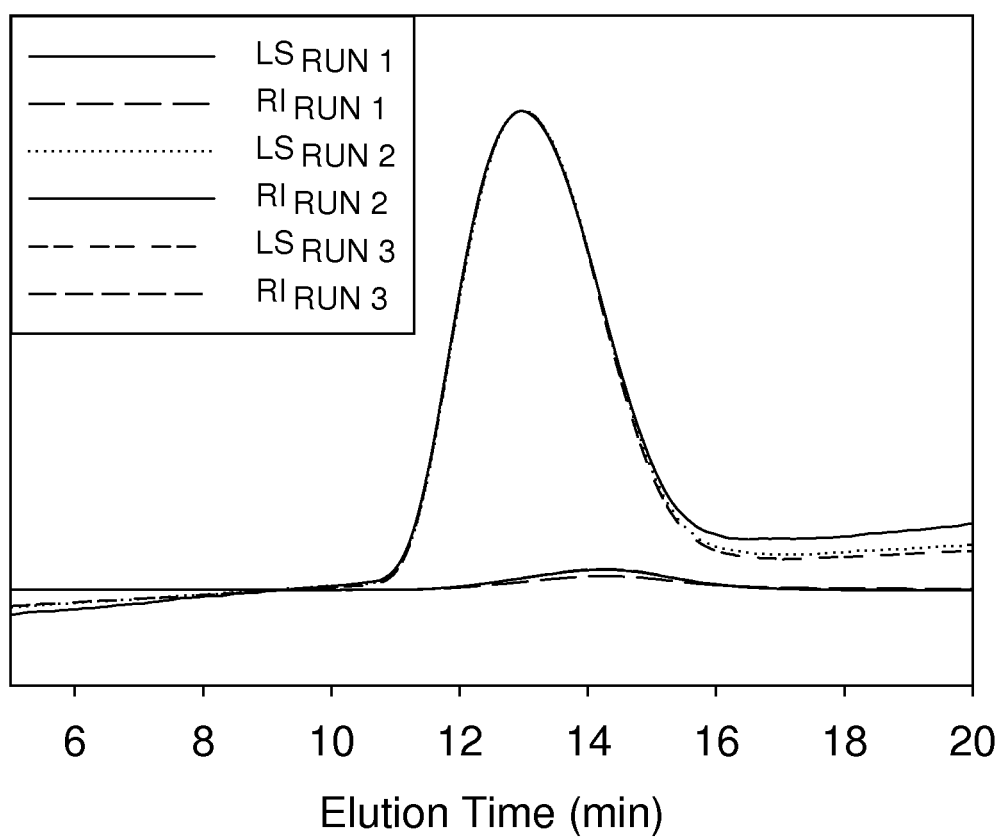
FIG. 7 is a graph of gel permeation chromatography (GPC) showing the light scattering and refractive index (RI) traces needed to calculate the molecular weight ($M_w$) and number average molecular weight ($M_n$) for the Tert-butyl acrylate (tBA) thermoplastic.

The tBA based thermoplastic was made via a thermal initiated free radical polymerization process to be used as the SH agent in the SMASH system. The resultant thermoplastic after precipitation and drying step was a brittle, white, and porous material. GPC analysis revealed an average $M_n$=86,200 g/mol, $M_w$=177,000 g/mol and a PDI of 2.06 based on three 5 mg thermoplastic/mL THF samples. FIG. 7 shows the GPC data analysis for the light scattering and infrared traces, and Table 1 below shows the numerical values obtained to calculate the $M_n$, $M_w$, and PDI averages.

TABLE 1

| Sample | $M_n$ (g/mol) | $M_w$ (g/mol) | PDI |
|---|---|---|---|
| 1 | 7.02E+04 | 1.44E+05 | 2.046 |
| 2 | 6.95E+04 | 1.45E+05 | 2.085 |
| 3 | 1.19E+05 | 2.43E+05 | 2.049 |
| Average | 8.62E+04 | 1.77E+05 | 2.06 |

The $M_n$s of two out of the three samples had similar values where the third sample had a higher $M_n$. The $M_w$ values followed the same trend. This trend is expected as the molecular weights are hard to control and reproduce when conducting a free radical polymerization process. The PDI had approximately the same values among all three samples tested where these PDI values were expected for free radial polymerization techniques.

SMASH films were fabricated using a UV polymerization method where four compositions explained in section 3.3.1 were made. All films were removed from the glass mold with ease where all the samples were robust, rigid and transparent post cure with a smooth surface finish. It was observed however, that the 1-tBA$_{50}$:n-tBA$_{50}$ sample contained some bubbles in the bulk of the film. It is hypothesized that the local viscosity formed from the high thermoplastic content is the source of the bubbles.

Figure 8:
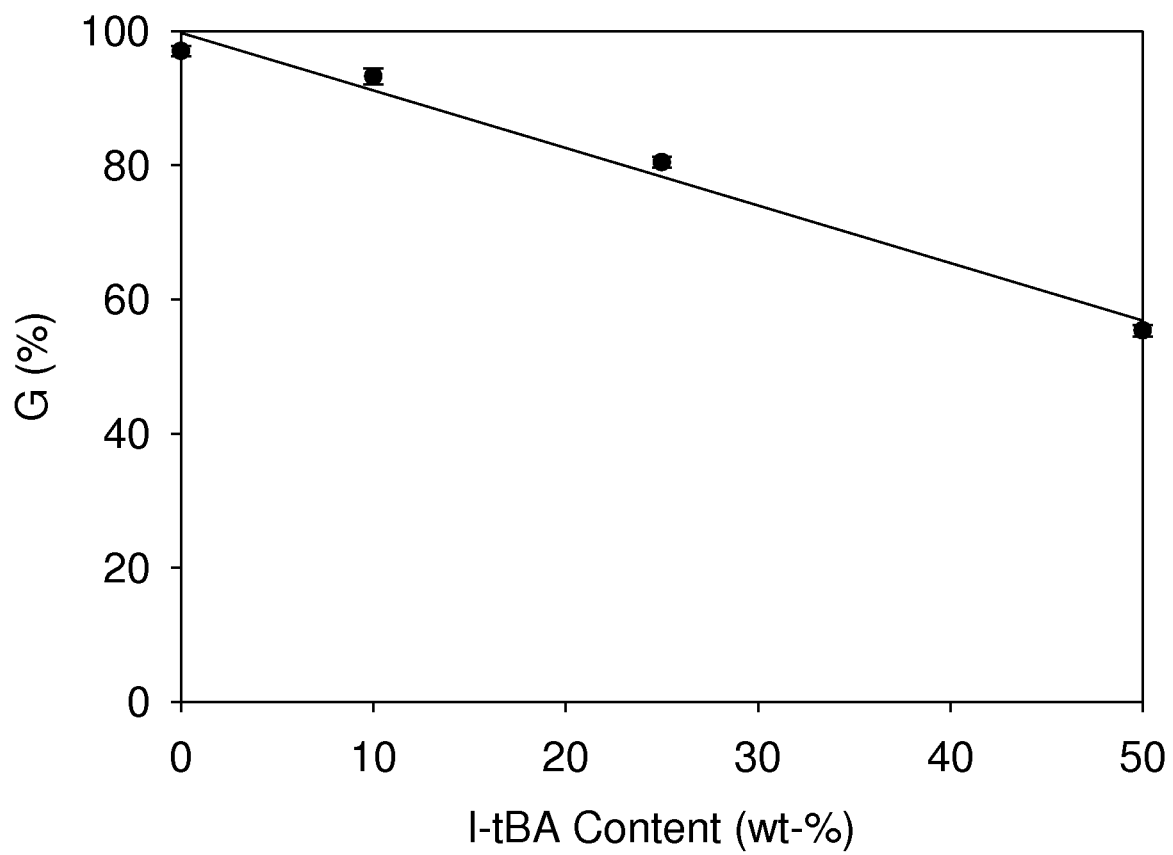
FIG. 8 is a graph showing the dependence of the 1:n-tBA blend's gel fractions (G(%)) by methanol extraction for all compositions tested as a function of tBA thermoplastic content. Data shows the average of three samples tested where the line represents the linear regression of the data.

Degree of shape memory network formation was measured by gel fraction experiments. This was done by submerging small cured specimens of each composition in methanol and agitating for 24 h at 25° C. where each sample was weighed pre and post methanol extraction. Gel fractions were calculated using equation 1 above. All samples remained amorphous pre and post extraction where the samples expanded in volume in the methanol during the 24 h period. The sample volume expansion is due to solvent swelling of the tBA network. All samples remained intact during the swelling process. FIG. 8 shows a linear relationship of gel fraction % as a function of tBA thermoplastic content where Table 2 below shows the gel fractions (G%) for the average of three samples tested among the four compositions made.

TABLE 2

| Composition | AVE G(%) | STDEV |
|---|---|---|
| (0:100) | 97.0 | 0.8 |
| (10:90) | 93.2 | 1.2 |
| (25:75) | 80.5 | 0.8 |
| (50:50) | 55.4 | 0.9 |

The G values show a decreasing trend with a decrease in network formation. This means that with the increase in tBA thermoplastic content, the degree of network formation decreased which was as expected. It is confirmed that all thermoplastic content was successfully extracted leaving the network formed as the G values are similar in magnitude to that of network wt-%.

Figure 9A:
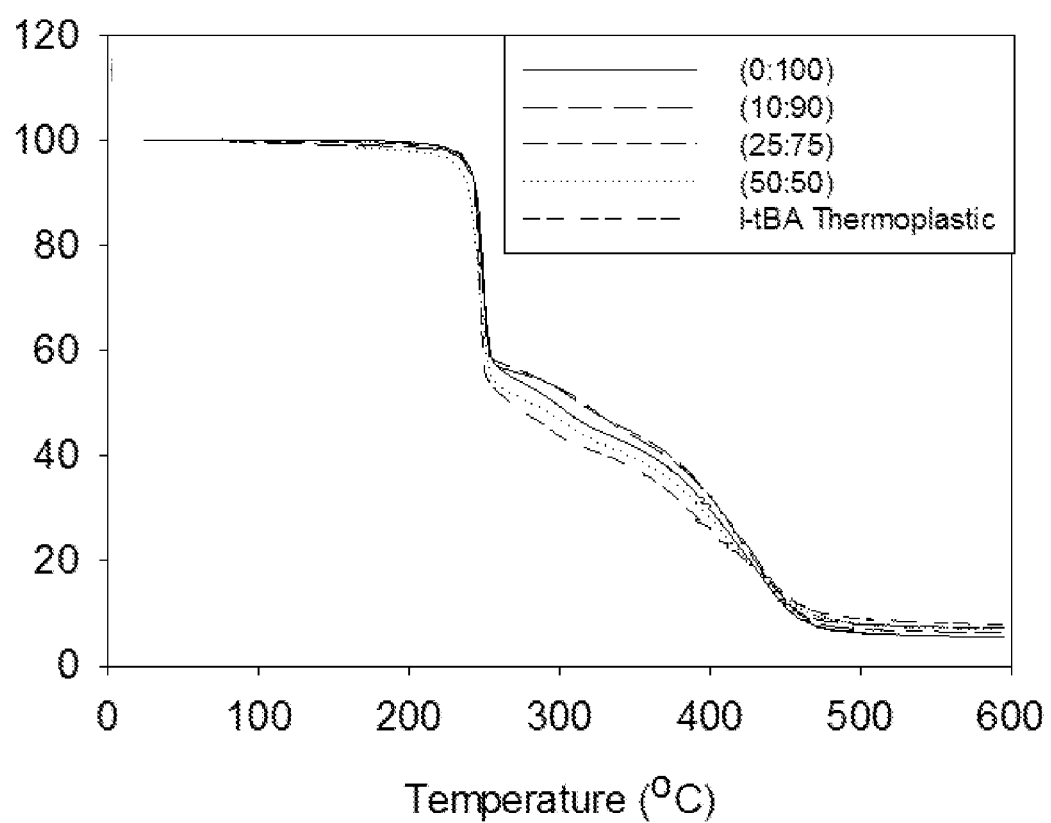
FIG. 9A is a representative thermogravimetric analysis (TGA) curves showing degradation temperatures where all l:n-tBA compositions and neat tBA thermoplastic were heated at 10° C./min to 600° C.

TGA analysis was conducted in order to examine the onset degradation temperatures of all compositions tested. The onset degradation temperatures are important to analyze as the samples start to decompose and lose their structural and mechanical properties at the onset point. FIG. 9A shows representative TGA curves of each compositions and neat tBA thermoplastic. tBA monomer could not be analyzed using the TGA as it is a volatile liquid and cannot be accurately tested. It is hypothesized that the tBA monomer will evaporate completely prior to degradation. There is a common trend among all the compositions and thermoplastic where the first weight drop indicates the onset degradation temperature ranging from 259 C.°±1.3 to 260° C.±0.3 (Table 3) below for three samples tested.

TABLE 3

| Composition | AVE Onset Degradation (°) | STDEV |
|---|---|---|
| (0:100) | 260.0 | 1.3 |
| (10:90) | 259.2 | 0.9 |
| (25:75) | 259.5 | 0.3 |
| (50:50) | 259.9 | 0.3 |

Figure 9B:
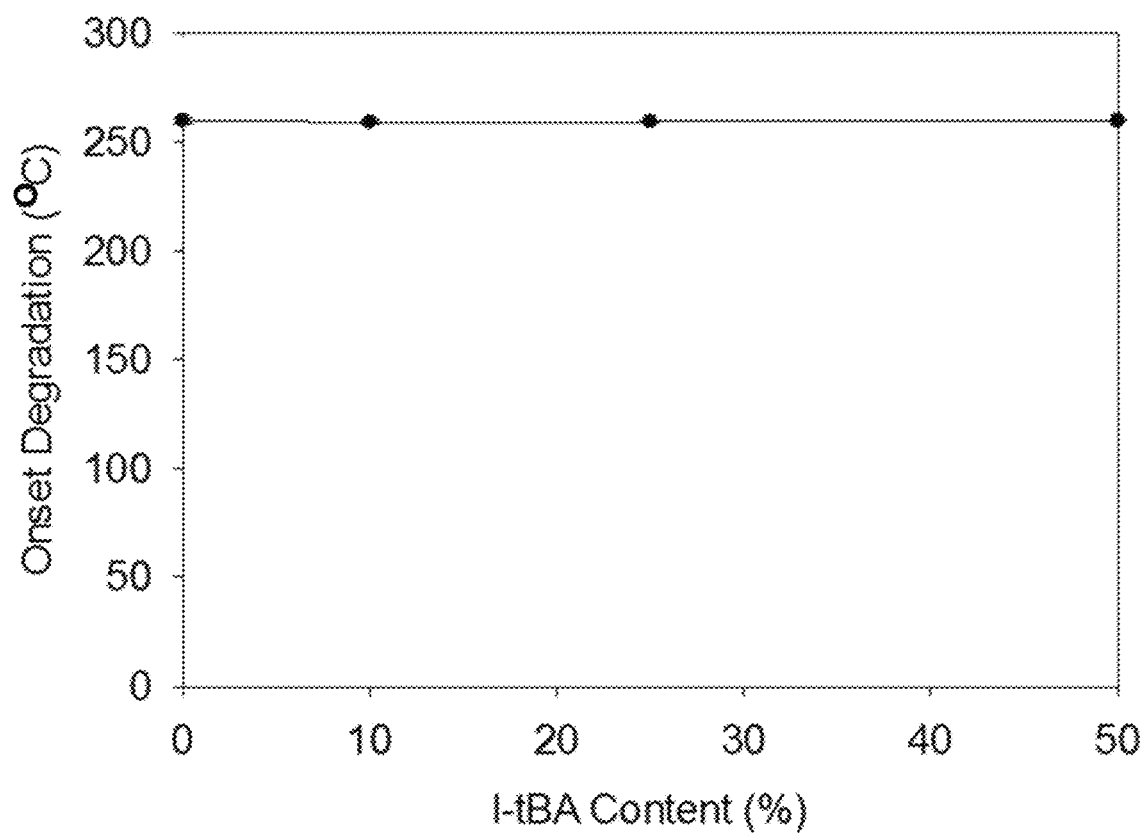
FIG. 9B is a graph showing onset degradation temperature vs. tBA thermoplastic wt-% content for an average of three samples for each composition tested.

The onset degradation temperature is hypothesized to be the tBA side chains degrading. The increase in weight loss with the increase in temperature is hypothesized to be the backbone of the tBA polymer degrading. FIG. 9B shows the onset degradation temperature vs. tBA thermoplastic wt-% content for an average of three samples tested. All onset temperatures were similar in magnitude which was as expected since the polymers used did not change among the compositions studied.

Figure 10A:
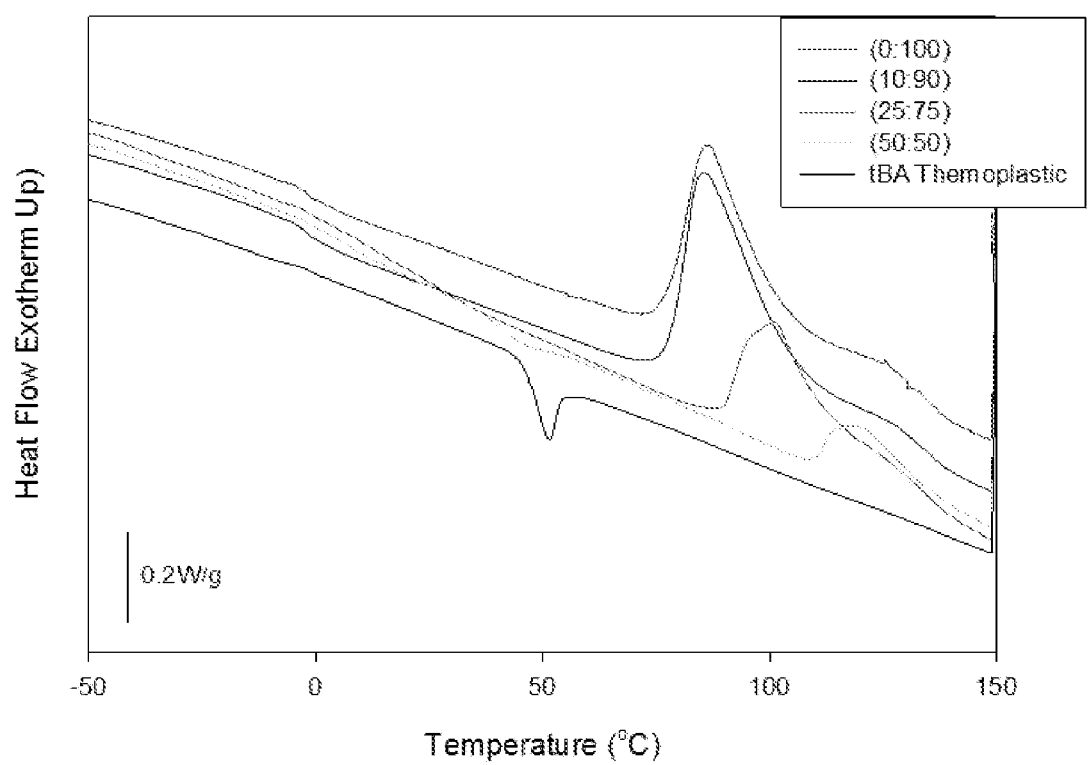
FIG. 10A is a graph of the first heating traces of the exothermic peak indicating complete cure was not accomplished among the l:n-tBA systems.
Figure 10B:
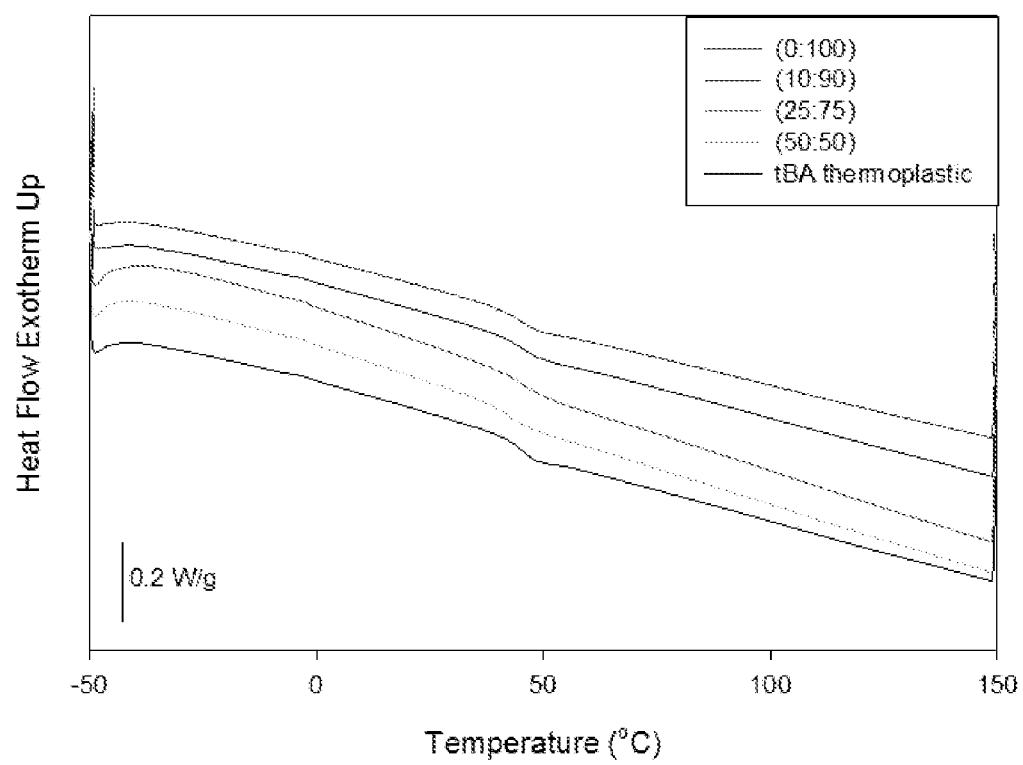
FIG. 10B is a graph of the second heating revealing the $T_g$ transitions for all the compositions tested with no exothermic peak evident.

DSC analysis was conducted in order to evaluate the $T_g$ of all the compositions and neat tBA thermoplastic. $T_g$ is an important polymer characteristic as it reveals the onset of chain molecular motion in polymeric systems and the onset for crack-closure during the SMASH process. This is where polymers transition from a hard glassy state to a rubbery state. FIG. 10A shows representative curves of the first heating traces where an exothermic peak is evident. This peak suggests that all compositions cured for 1 h under UV exposure were not completely cured. FIG. 10B shows the second heating of these same samples where the exothermic peak was no longer evident, but instead the $T_g$'s were revealed ranging from 47° C. to 49° C., as seen in Table 4 below.

TABLE 4

| Composition | AVE $T_g$ (° C.) | STDEV |
|---|---|---|
| (0:100) | 48.3 | 1.6 |
| (10:90) | 48.6 | 0.2 |
| (25:75) | 48.9 | 0.5 |
| (50:50) | 47.3 | 1.0 |

Figure 10C:
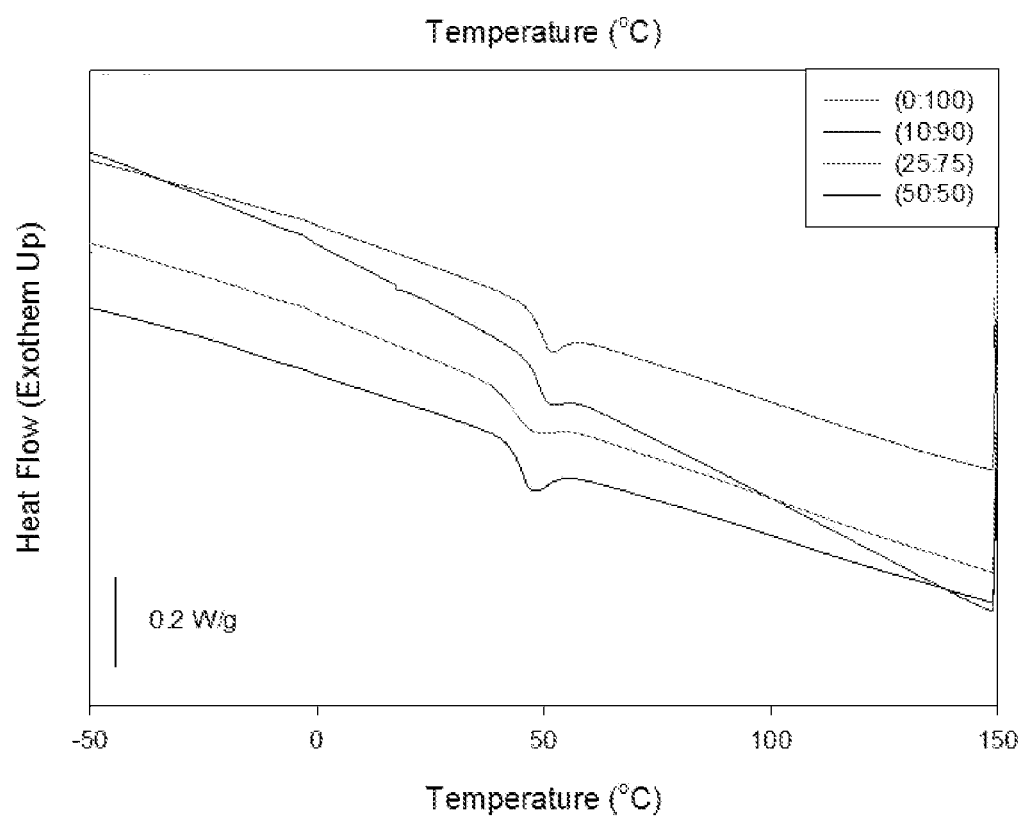
FIG. 10C is a graph of the first heating from samples that were post cured revealing complete cure and $T_g$ transitions with no exothermic peak evident.
Figure 10D:
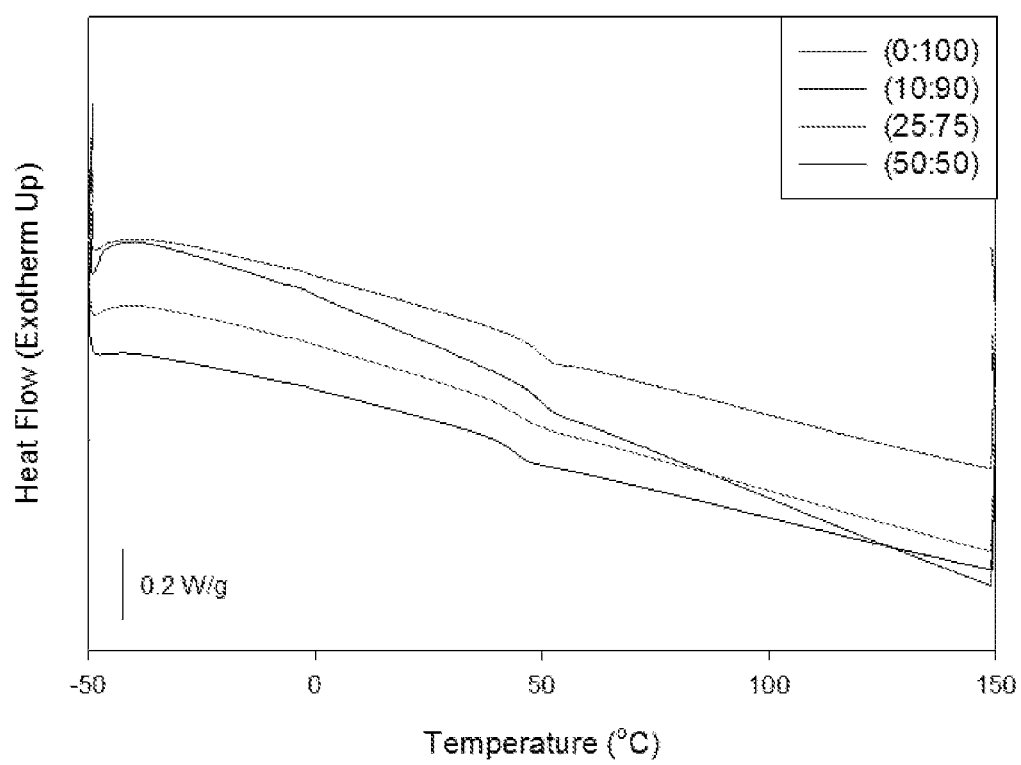
FIG. 10D is a graph of the second heating from samples that were post cured revealing complete cure and $T_g$ transitions with no exothermic peak evident.
Figure 11:
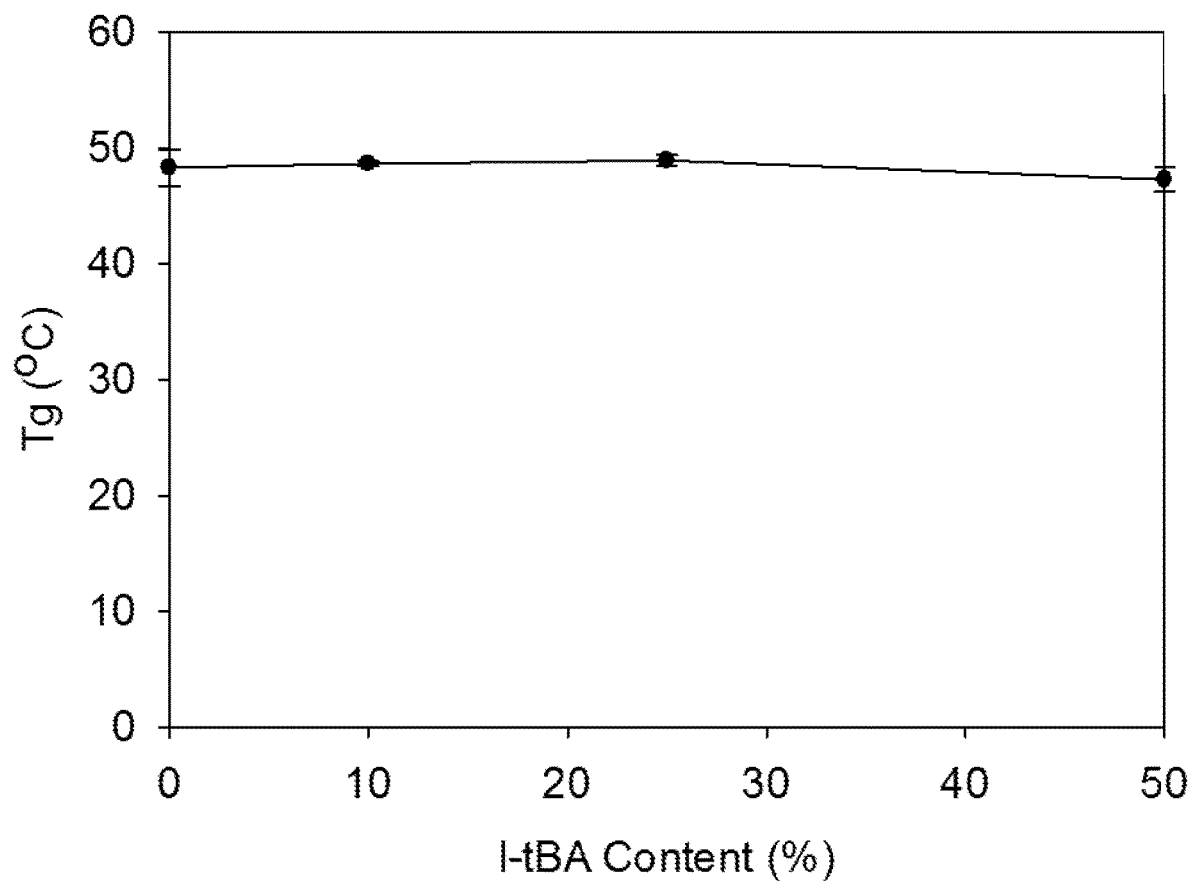
FIG. 11 is a graph showing the $T_g$ obtained from the second heating of the post cured l:n-tBA samples, where three samples were tested for each composition as a function of tBA thermoplastic wt-% content.

This indicates that all the samples completely cured upon the second heating. All samples were then post cured at 120° C. for 10 min and cooled at RT for 10 min where DSC analysis was repeated. FIG. 10C shows the first heating of the post cured samples showing the $T_g$ transitions only with no evidence of exothermic peaks. This means all samples that were post cured showed complete curing. FIG. 10D shows the second heating of the post cured samples where these $T_g$ values were reported and are shown to have the same values as the as cured samples in the $2^{nd}$ heating trace. FIG. 11 shows the average $T_g$ values of three samples tested as a function of tBA thermoplastic wt-%. Table 4 above shows the numerical values of the average $T_g$'s with accompanying standard deviations. The $T_g$ values were approximately the same in magnitude regardless of composition. It was initially hypothesized that more crosslinking formed due to a higher monomer wt-% would increase the $T_g$ as more energy is required for polymer chain motion between crosslinks. This would mean that a higher thermoplastic content would lead to a lower $T_g$. However, this was not an evident trend among these films studied.

Figure 12A:
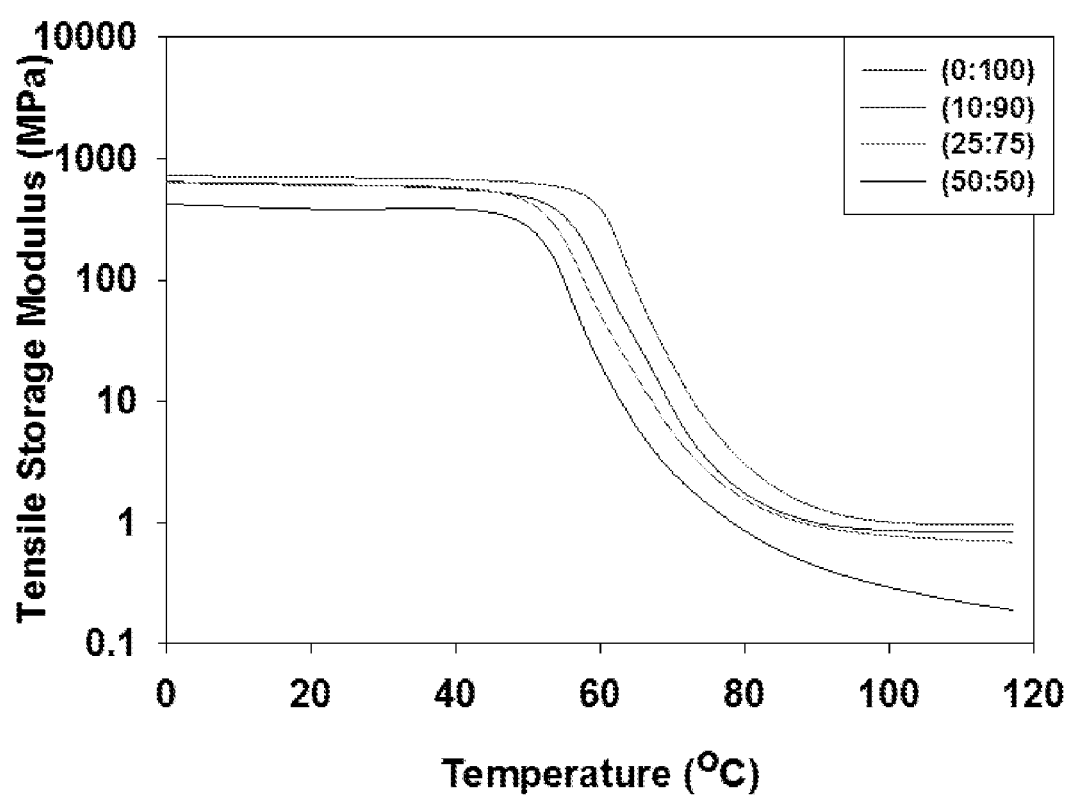
FIG. 12A is a graph of the representative traces showing tensile storage modulus (E') as a function of temperature among all 1:n-tBA compositions tested.
Figure 12B:
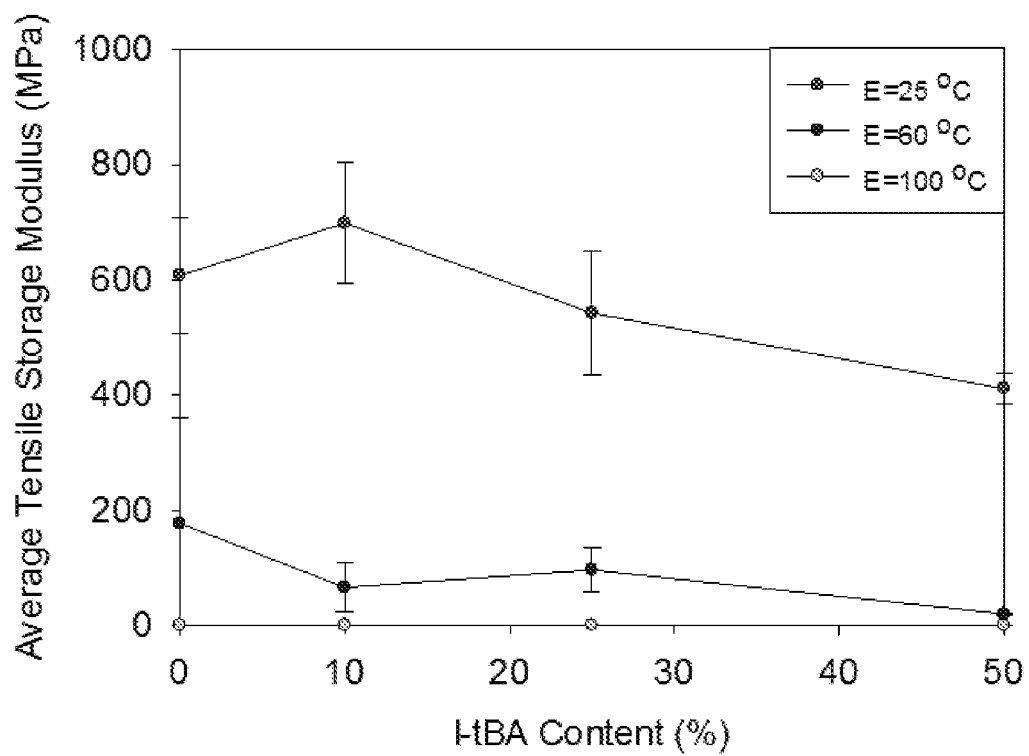
FIG. 12B is a graph showing tensile storage modulus as a function of tBA thermoplastic content for three samples tested for each composition where standard error bars are shown and the tensile storage modulus was recorded at 25° C., 60° C., and 100° C. to observe the change in thermomechanical properties at these temperatures.

DMA experiments were conducted to obtain the tensile storage modulus (E') transitions as a function of temperature. FIG. 12A shows representative traces of the E' transitions as a function of temperature for each composition tested. Here, the onset $T_g$ and rubbery plateau is observed. FIG. 12B shows the average E' as a function of tBA thermoplastic wt-% content for three specimens tested at 25° C., 60° C. and 100° C. Table 5 below shows the average numerical values of E' with standard deviations.

TABLE 5

| Composition | AVE $E'_{25° C.}$ (MPa) | STDEV | AVE $E'_{60° C.}$ (MPa) | STDEV | AVE $E'_{100° C.}$ (MPa) | STDEV |
|---|---|---|---|---|---|---|
| (0:100) | 607.8 | 100.5 | 178.0 | 184.3 | 1.0 | 0.13 |
| (10:90) | 698.6 | 104.6 | 66.4 | 41.6 | 0.9 | 0.08 |
| (25:75) | 542.3 | 108.0 | 96.6 | 38.9 | 0.9 | 0.11 |
| (50:50) | 411.6 | 27.6 | 20.3 | 1.0 | 0.3 | 0.02 |

At 25° C. the samples are rigid and chain mobility is highly restricted where E' was 411.6±27.6 MPa for tBA$_{50}$:n-tBA$_{50}$ sample and 607.8±100.5 MPa for the tBA$_0$:n-tBA$_{100}$ composition. As the temperature increases to 60° C., the $T_g$ is observed where chain movement initiates. Here the E' was 20.3±1.0 MPa for the tBA$_{50}$:n-tBA$_{50}$ sample and 178.0±184.3 MPa for the tBA$_0$:n-tBA$_{100}$ composition. Increasing the temperature further to 100° C. the rubber plateau is observed where the polymer chains are in a rubber elastic state. The E' was 0.3±0.02 MPa for tBA$_{50}$:n-tBA$_{50}$ and 1.0±0.13 MPa for tBA$_0$:n-tBA$_{100}$ sample. Although above the $T_g$, the tBA SMASH system is able to sustain its geometry due to the crosslinks present in the tBA thermoset network. The elimination of the crosslinks needed to form the network would result in the sample to flow. There is a definite trend of decreasing E' with the increase of thermoplastic content and this trend is observed among all three temperatures. This is expected as the increase of thermoplastic content decreases the overall mechanical properties. Since the thermoplastic has a linear architecture and is not covalently crosslinked to the SM network it does not bear a significant amount of load to have a high mechanical response to forces. It can also be observed that the samples which have a higher network formation yield a higher rubbery modulus at 100° C. This is evident for the tBA$_0$:n-tBA$_{100}$, 1-tBA$_{10}$:n-tBA$_{90}$, and 1-tBA$_{25}$:n-tBA$_{75}$ samples which showed the same tensile storage modulus at 100° C. However, for the tBA$_{50}$:n-tBA$_{50}$ sample, the rubber modulus was significantly lower when compared to the other composites. It is known in polymer physics fundamentals that the modulus (E) is directly proportional to the crosslink density (n) as shown in the following equation: E=3nRT where the R=gas constant and T=temperature. Therefore, with increasing thermoplastic content there is a decrease in tensile storage modulus because of the decrease in crosslink density.

Figure 13A:
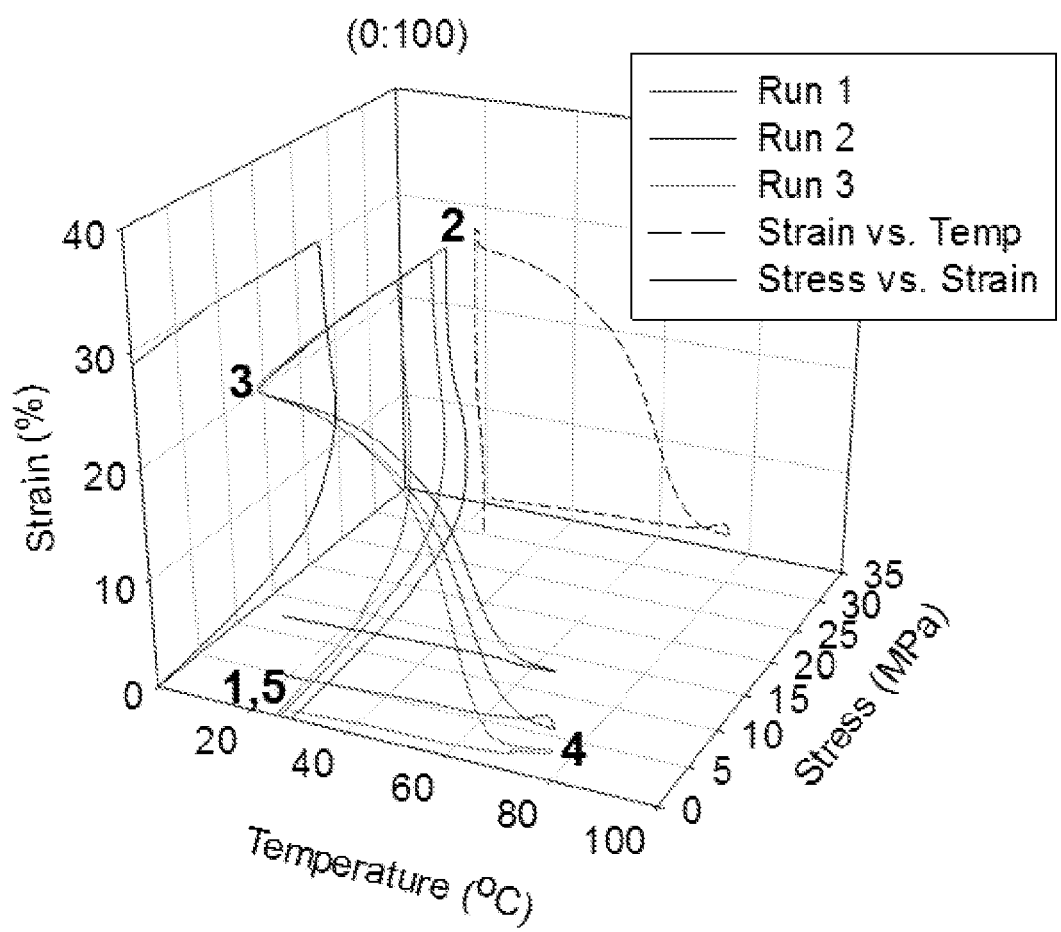
FIG. 13A is a reversible plasticity shape memory (RPSM) graph showing the 1:n-tBA composition of 0:100.
Figure 13B:
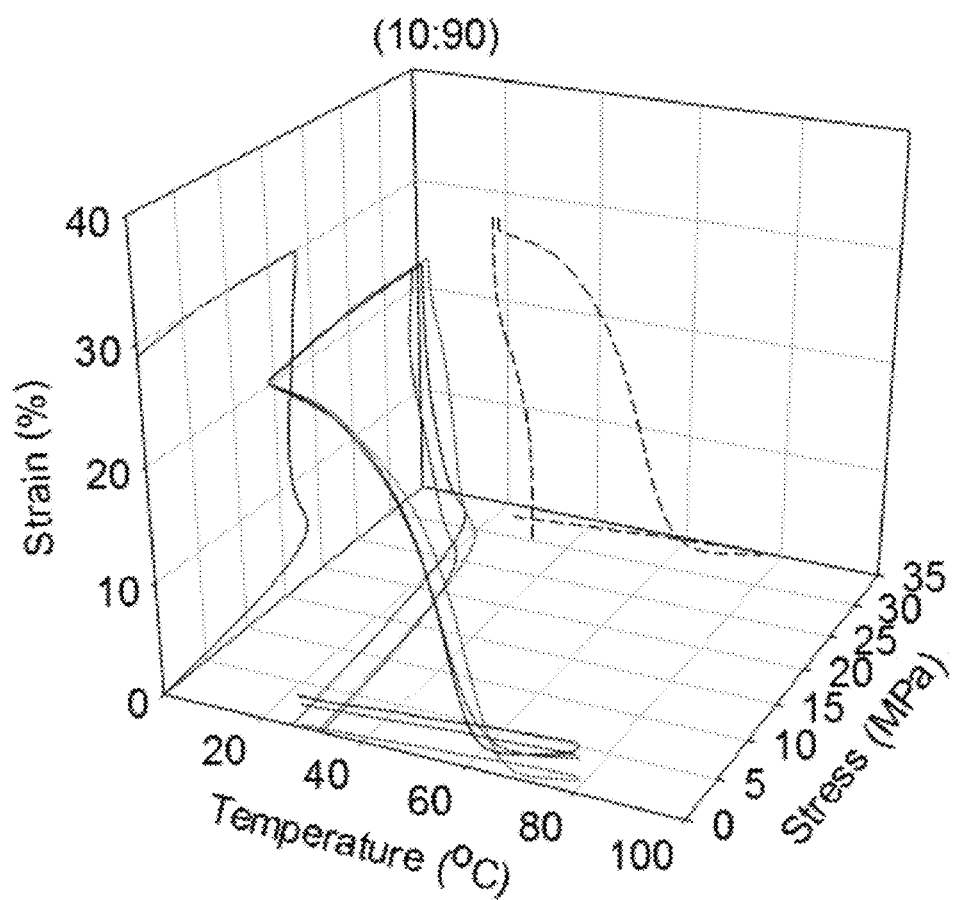
FIG. 13B is an RPSM graph showing the 1:n-tBA composition of 10:90.
Figure 13C:
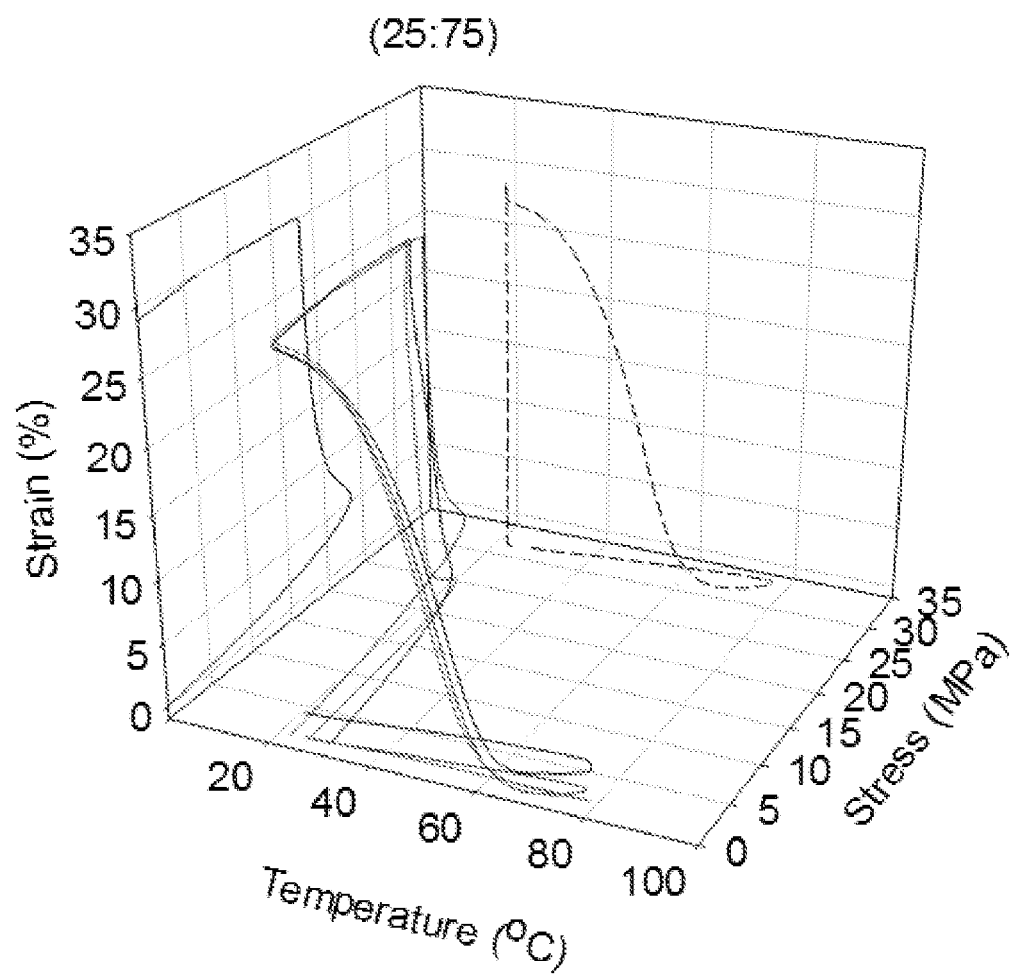
FIG. 13C is an RPSM graph showing the 1:n-tBA composition of 25:75.
Figure 13D:
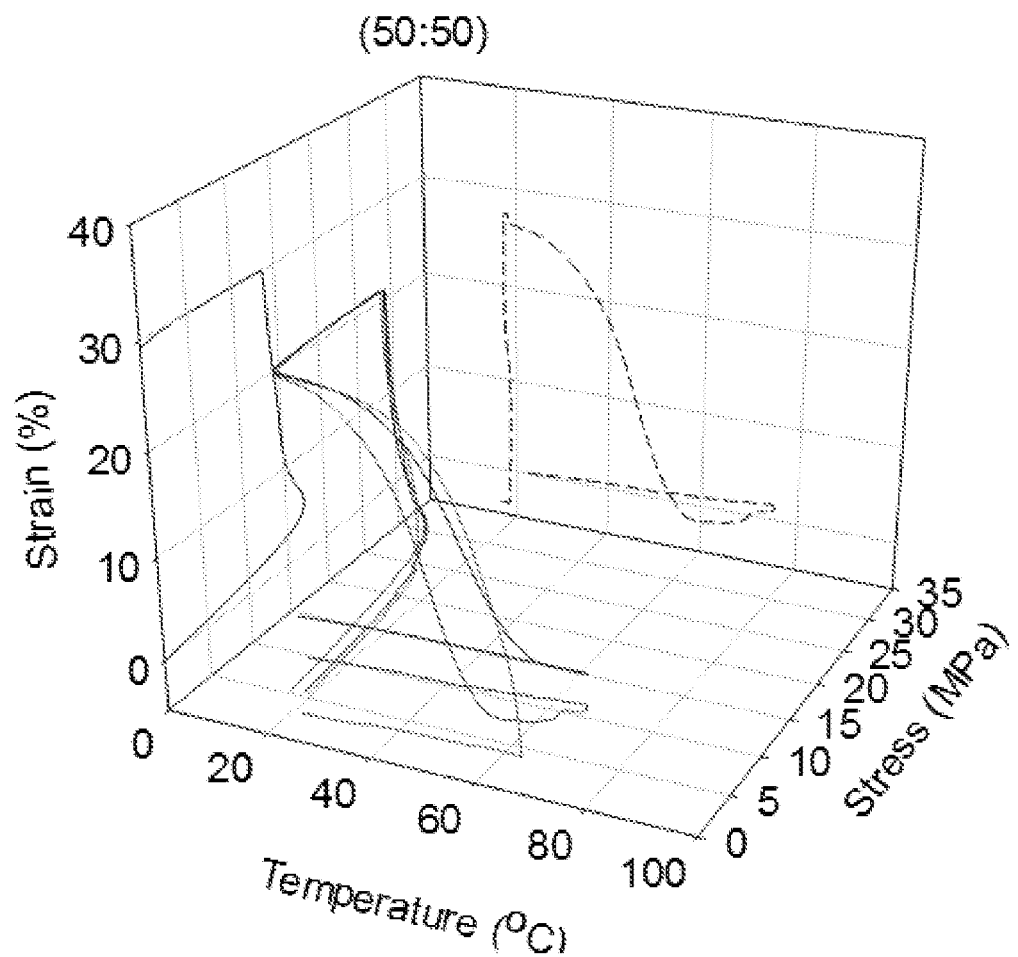
FIG. 13D is an RPSM graph showing the 1:n-tBA composition of 50:50.
Figure 14A:
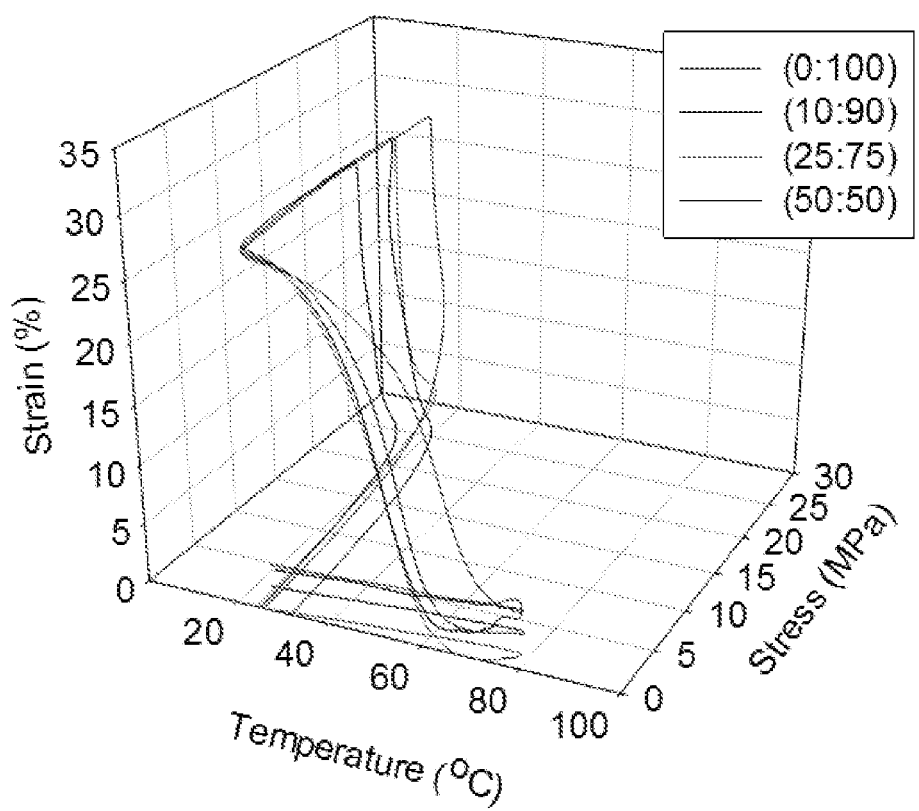
FIG. 14A is a representative RPSM graph for all 1:n-tBA compositions tested as a function tBA thermoplastic content.
Figure 14B:
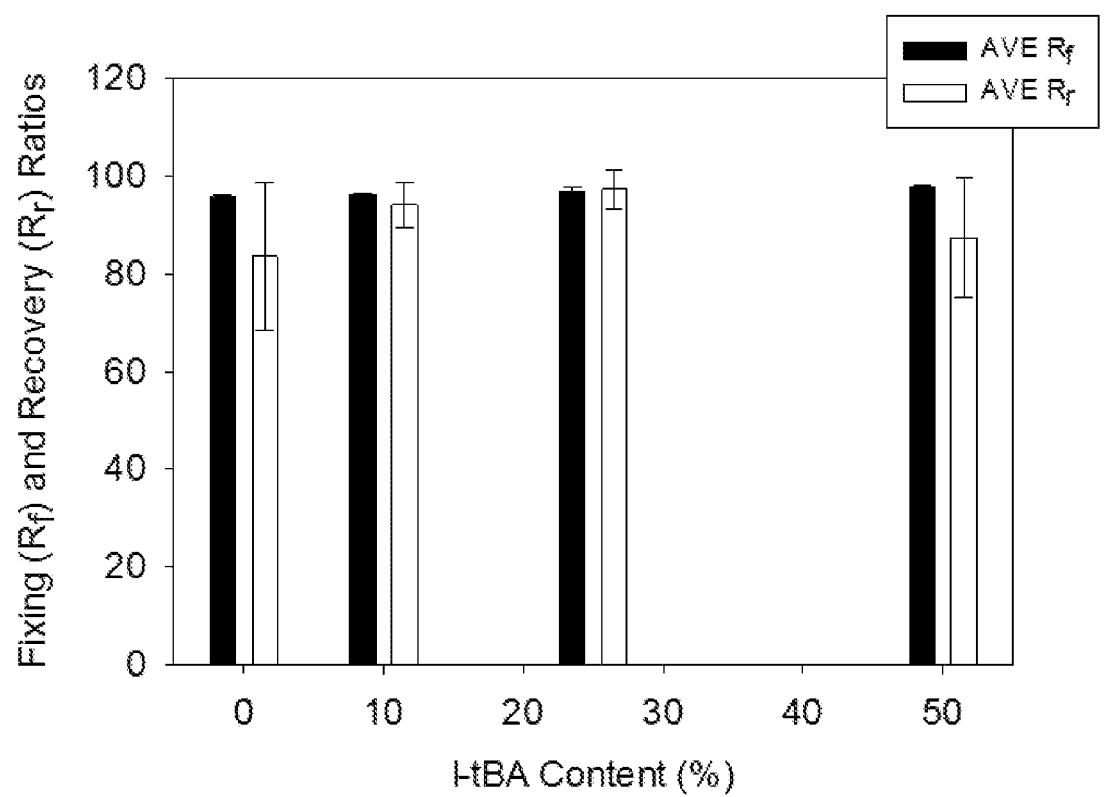
FIG. 14B is a graph of the fixing ($R_f$) and recovery ($R_r$) ratios for all 1:n-tBA compositions tested as a function tBA thermoplastic content.

RPSM was characterized to observe a new SM effect, reversible plasticity SM. Here, each specimen was deformed below its $T_g$, unloaded to observe fixing and then recovered above $T_g$ to regain its original shape. FIGS. 12A through 12D show representative 3D RPSM graphs of l-tBA:n-tBa compositions. The sample, already in its vitrified state, is elastically and plastically deformed to achieve 30% strain (step 1-2) at RT, as seen in FIG. 12A. In this case, the polymer chains are aligning in the direction of loading during deformation. The sample is then unloaded to observe the fixing properties (step 2-3), as seen in FIG. 12B. Rubber elasticity can be used to explain the polymer chain response. When the crosslinked polymer chains are at equilibrium, in its undeformed state, the tBA polymer chains are in a highly coiled entropic conformation. As the network is uni-axially stretched at RT to achieve 30% strain, the entropy is significantly reduced since the number of polymer conformations decreases. Upon force release, the polymer chains, which can be modeled as entropic springs, elastically recover. The sample is able to elastically recover due to the stored energy the sample gained during deformation. The specimen is then heated to 80° C. to observe the plastic deformation recovery for near complete shape recovery (step 3-4), as seen in FIG. 12A, of each specimen. Here, the polymer chains go from a vitrified state to a liquid flow state allowing for the chains to regain their highly coiled configuration. The sample is then cooled to RT to complete the RPSM cycle (step 4-5), as seen in FIG. 12B. This process was done three times on three different samples from each composition. The back plane shows a graph of strain vs. temperature to further convey the elastic and plastic deformation followed by shape recovery (black dashed line). The side plane shows a stress vs strain to show the complete cycle in 2D (black solid line). FIGS. 12A through 12D show RPSM curves for (a) (0:100), (b) (10:90), (c) (25:75), and (d) (50:50), respectively. All graphs showed evidence of an elastic region, yield point, plastic deformation and cold drawing region which are unique phenomena among viscoelastic polymers. FIG. 13A shows representative RPSM curves for all compositions tested on one graph to compare each composition among each other. It can be observed that all samples regardless of tBA SH thermoplastic content can achieve 30% strain, demonstrate near complete fixing upon unloading and near complete shape recovery. FIG. 13B shows a bar graph of the fixing ($R_f$) and recovery ($R_r$) ratios among all compositions tested as a function of thermoplastic wt-% content. Table 6 below shows the average $R_f$ which ranged from 95.9% to 97.8% and $R_r$ of 83.6% to 97.3% among all compositions.

TABLE 6

| Composition | AVE $R_f$ | STDEV | AVE $R_r$ | STDEV |
|---|---|---|---|---|
| (0:100) | 95.9 | 0.3 | 83.6 | 15.2 |
| (10:90) | 96.3 | 0.1 | 94.1 | 4.5 |
| (25:75) | 97.0 | 0.8 | 97.3 | 3.9 |
| (50:50) | 97.8 | 0.2 | 87.3 | 12.2 |

These findings suggest that all compositions regardless of thermoplastic content were able to maintain the temporal geometry after unloading. Similarly, the samples were also able to recovery with evidence of small residual strains after shape recovery. RPSM plays a critical role for surface damage on coatings because most damage incurred initiates below the coating's $T_g$ and therefore results in a significant amount of plastic deformation. The RPSM effect shows that elastic and plastic deformation can occur and yet are reversible upon a thermal stimulus. This is critical as this recovery is necessary for scratch repair on coatings.

One Way Shape Memory (1WSM) was conducted on all compositions to observe a unique and different form of shape memory when compared to RPSM. Whereas the samples were stretched below their $T_g$ in RPSM, here the samples were first heated above their $T_g$ and then deformed, cooled to achieve temporal deformation and heated again for shape recovery. FIGS. 15A through 15D show the 1WSM for (0:100), (10:90), (25:75), and (50:50) respectively. Each sample was heated to 80° C. where it was in its beginning point of the rubbery state and then elastically deformed to achieve 40% strain. Microscopically, the polymer chains aligned in the direction of the uni-axial force then vitrified to this temporal shape when cooled to 0° C. Here, the polymer chains are in their low configuration state where temporal fixing is maintained when cooled to below the $T_g$. The load is released to observe the fixing properties of the system and then heated to 80° C. for sample restoration of its original dimensions. FIG. 16 shows a bar graph of the average $R_f$ and $R_r$ where Table 7 below shows the average $R_f$ ranging from 98.3% to 98.9% and $R_r$ ranging from 91.7% to 95.7%.

TABLE 7

| Composition | AVE $R_f$ | STDEV | AVE $R_r$ | STDEV |
|---|---|---|---|---|
| (0:100) | 98.6 | 0.3 | 95.7 | 7.2 |
| (10:90) | 98.3 | 0.1 | 94.4 | 10.6 |
| (25:75) | 98.9 | 0.4 | 91.7 | 15.8 |
| (50:50) | 98.5 | 0.3 | 93.9 | 26.8 |

These values were calculated using equations (2) and (3) above. The 1WSM data shows that all compositions are able to achieve the desired strain regardless of thermoplastic content. This means that the SM effect is not impaired or limited from the low or high thermoplastic content. The data also shows great cycle repeatability where the specimens tested for three consecutive 1WSM cycles did not deteriorate or have compromised mechanical properties. This is also true when studying the $R_r$ trends where the thermoplastic does not interfere with the recovery of the samples. However, it is important to observe that the $R_r$ are not 100% as cycle 1 in relation to cycle 2 and 3 does not have the same starting point. It is hypothesized that this discrepancy is related to the thermal expansion of the DMA clamp fixtures and also due to the sample thermal expansion which is referred to as thermal strain. This means that the polymer chains are occupying a larger volume in the sample and thus results in the sample expanding at a given temperature. Although, RPSM is more relevant for scratch repair in coatings, 1WSM serves to show that conventional SM is achieved in fully amorphous systems.

Chemical modification of glass slides was accomplished using a piranha solution to remove organic impurities from the surface of the as-purchased glass slides to expose the natural hydroxyl groups. Visually the glass slides looked the same when compared to the as-purchased slides.

Silanization of glass slides was carried out to promote good adhesion of the l:n-tBA coatings to the glass substrate as well as to prevent delamination from the glass by using a (3-acryloxyproply) trimethoxysilane coupling agent. The glass slides visually looked transparent where FTIR-ATR analysis was conducted to observe the presence of carboxyl group which showed a peak at 1729.26 cm$^{-1}$ as seen in FIG. 17. This yielded a successful salinization process.

The silanized glass slides prepared in the previous section were then used to make the 10 μm tBA coatings of various compositions. All coatings cured were approximately 12 μm in thickness and were uniform along the length and width of the coating substrate. All coatings did not delaminate upon the removal of the top unsilanized slides. All coatings visually look transparent post cure such as the representative image of a coating on a glass substrate seen in FIG. 6.

Optical microscopy (OM) was carried out to measure the SH efficiency of each l:n-tBA coating by taking OM micrographs at three different coating stages: virgin, damaged, and thermally treated. The OM micrographs showed no evidence of coating-glass substrate delamination where a uniform degree of damage is observed. The SH efficiency was then calculated by comparing the area in pixels of the scratch and thermally treated coating. The average SH efficiencies of each composition are documented in FIG. 18 and Table 8 below, where the SH efficiency increased with increasing thermoplastic wt-% content.

TABLE 8

| Sample | $A_{SS}$ | STDEV | $A_{TTS}$ | STDEV | SH (%) | STDEV |
|---|---|---|---|---|---|---|
| (0:100) | 8.6E+04 | 3.3E+04 | 4.1E+04 | 8.4E+03 | 4.5E+01 | 2.8E+01 |
| (10:90) | 1.8E+05 | 4.0E+04 | 5.2E+04 | 4.8E+04 | 7.4E+01 | 1.9E+01 |
| (25:75) | 8.5E+04 | 2.7E+04 | 2.4E+04 | 5.0E+03 | 7.0E+01 | 1.1E+01 |
| (50:50) | 1.9E+05 | 2.9E+04 | 3.6E+04 | 2.5E+04 | 8.1E+01 | 1.3E+01 |

For the l:n-tBA (0:100) coating there was a SH % of $4.5 \times 10^1 \pm 2.8 \times 10^1$% where the l:n-tBA (50:50) coating was $8.1 \times 10^1 \pm 1.3 \times 10^1$%. This, therefore, means a direct relationship between the SH efficiency and the increase in amount of linear tBA thermoplastic was observed. This also means that the l-tBA$_{50}$:n-tBA$_{50}$ shows optimum healing for repairing scratches on coatings.

SEM micrographs of all the compositions showed that the scratches visually have a variable degree of damage, although the damage was done uniformly with the same normal force used for all compositions tested. It is important to note that the damage was performed at RT which is significantly lower than the $T_g$ of the coating ($T_g$~46° C.) ($T_{scratch}$<$T_{g.coating}$). This means the coating was damaged in a brittle manner at RT. It is hypothesized that this causes uncontrolled brittle damage where small cracks are formed perpendicular to the primary scratch that is formed. These small uncontrolled cracks dissipate energy where the energy created to make the cracks should be stored in the coating so that this energy can be reused for crack closure assisted by SM and thus enabling the damage to heal. In reexamining the representative SEMs, there is significant evidence of brittle damage which are indicative of the flakes that are seen around the scratch formed. When the coatings are then thermally treated to allow for SM and SH to initiate, there is evidence of crack closure when compared to the damaged state. The SEM micrographs also show a smooth topography once thermally treated as it is hypothesized that plastic deformation was evident on the ridges of the scratch perimeter with scratched coatings on the top row. However, in some instances there is also evidence of some material removal where small holes at the damaged site are shown post crack closure. The inset SEM's show the ends of the scratch to observe if material removal was apparent. The SEMs show no signs of material removal, but instead along the length of the scratch. This is a problem as material removal will render the coating to be permanently damaged as the SM effect cannot close the scratch completely due to the insufficient material needed for crack closure. Lowering the $T_g$ of the system will thus lead to optimized behavior, provided $T_g$ remains greater than room temperature, i.e., about 25° C.

Spectrometer studies were done to analyze the transmittance percentage of 1:n-tBA coatings at the virgin, damaged, and thermally treated state. FIG. 19 shows average transmittance (%) vs wavelength (nm) graphs of three samples in each composition. FIG. 20 through FIG. 22 show all the raw transmittance (%) vs wavelength (nm) graphs for each of the four compositions where three tests were performed on each coating. Table 9 below shows the average of the transmittance within the visible spectrum among four scratches analyzed.

TABLE 9

| Sample | Average Transmittance (%) | | | |
| --- | --- | --- | --- | --- |
| | (0:100) | (10:90) | (25:75) | (50:50) |
| Virgin | 98.28 | 99.65 | 97.01 | 98.99 |
| Damaged | 88.61 | 88.86 | 85.44 | 87.57 |
| Thermally Treated | 96.39 | 95.12 | 94.14 | 95.18 |

Analyzing the spectrometer data, it can be observed that samples in their virgin state allow approximately an average of 98% of the light to pass though the coating where in the damaged state an average of 88% of light was able to pass through relative to the glass slide, as seen in Table 9. After heating the coating, the light allowed through the thermally treated crack fluctuated slightly between compositions and is consistently greater than that of the damaged state where the transmittance was approximately an average of 95%, as seen in Table 9. It is also important to observe a small visible scar that is evident after thermal treatment, which may impair the visibility for user's vision. The goal is to have the coating appear in its virgin state.

This example outlines the fabrication and characterization of tBA SIPN single phase blends for optical applications. Films were fabricated where thermal and thermo-mechanical analyses were conducted in order to observe the thermal transitions and viscoelastic properties as a function of temperature necessary for crack closure and healing. Scratch testing and spectrometer analysis were conducted on thin clear 12 μm coatings to observe the SM and SH effect needed for scratch repair on coating surfaces. Transmittance studies were conducted pre and post damage and after thermal treatment where the 1-tBA$_{50}$:n-tBA$_{50}$ composition proved to be the best system for optimum SM and healing for scratch repair. Such SMASH coatings can be used for eye glassware, microscope lenses for industrial products as well as other applications where transparent SMASH coatings are needed for scratch repair and optimization of the coating composition for various application can be achieved by optimizing the $T_g$.

The coating system features a self-healing mechanism capable of repairing microcracks, scratches, and other types of damage while retaining optical quality transparency. As most commercial optical lens coatings offer scratch-resistance, not self-healing, a new coating must be applied to retain optimal visibility when the coating is damaged. With a coating according to the present invention, heating above Tg of the coating will trigger the SMASH effect, thereby healing the coating and allowing for maintained visibility and restoration of the mechanical properties of the coating. Optimization of the coating composition for various application can be achieved by optimizing the $T_g$.

What is claimed is:

1. An optical coating system, comprising:
    a single amorphous phase formed from a network polymer and a linear polymer;
    wherein the linear polymer is not covalently linked to the network polymer;
    wherein the linear polymer is randomly inter-coiled within the network polymer to form a semi-interpenetrating polymer network;
    wherein the network polymer is comprised of a monomer that is miscible with the linear polymer prior to polymerization of the network polymer; and
    wherein the network polymer and the linear polymer each have a glass transition temperature between 25 degrees Celsius and 40 degrees Celsius.

2. The system of claim 1, wherein the single amorphous phase comprises 10 percent of the linear polymer and 90 percent of the network polymer by weight.

3. The system of claim 1, wherein the single amorphous phase comprises 25 percent of the linear polymer and 75 percent of the network polymer by weight.

4. The system of claim 1, wherein the single amorphous phase comprises 50 percent of the linear polymer and 50 percent of the network polymer by weight.

5. The system of claim 1, further comprising a substrate bound to the single amorphous phase.

6. The system of claim 5, wherein the substrate comprises glass that is covalently bound to the single amorphous phase by silanization.

7. The system of claim 1, wherein the network polymer comprises a tert-butyl acrylate network.

8. The system of claim 7, wherein the tert-butyl acrylate network comprises a tert-butyl acrylate cross-linked with tetrathyleneglycol dimethacrylate.

9. The system of claim 8, wherein the linear polymer comprises a tert-butyl acrylate thermoplastic.

\* \* \* \* \*